US011433776B2

United States Patent
Otsuki et al.

(10) Patent No.: US 11,433,776 B2
(45) Date of Patent: Sep. 6, 2022

(54) VEHICLE INCLUDING $CO_2$ RECOVERY DEVICE FOR RECOVERING $CO_2$

(71) Applicant: TOYOTA JIDOSHA KABUSHIKI KAISHA, Aichi-ken (JP)

(72) Inventors: Hiroshi Otsuki, Gotemba (JP); Daiki Yokoyama, Gotemba (JP); Takahiro Suzuki, Susono (JP); Harumi Gotou, Susono (JP); Shingo Korenaga, Shizuoka (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 160 days.

(21) Appl. No.: 16/941,436

(22) Filed: Jul. 28, 2020

(65) Prior Publication Data

US 2021/0061122 A1    Mar. 4, 2021

(30) Foreign Application Priority Data

Aug. 27, 2019 (JP) .............................. JP2019-154762

(51) Int. Cl.
*B60L 53/66* (2019.01)
*B60L 53/30* (2019.01)
*B60L 53/14* (2019.01)
*B60S 5/00* (2006.01)
*B01D 53/02* (2006.01)
*B01D 53/62* (2006.01)

(52) U.S. Cl.
CPC ............. *B60L 53/66* (2019.02); *B01D 53/02* (2013.01); *B01D 53/62* (2013.01); *B60L 53/14* (2019.02);

(Continued)

(58) Field of Classification Search
CPC .......... B60L 53/66; B60L 53/14; B60L 53/30; B60L 2250/16; B60L 2270/00; B60L 53/16; B60L 53/60; B01D 53/02; B01D 53/62; B01D 2257/504; B01D 2258/06; B01D 2259/4558; B01D 53/0454; B01D 2253/108; B01D 2259/40096; B01D 2259/4566; B01D 53/0407; B01D 53/18; B60S 5/00; Y02A 50/20; Y02C 20/40;

(Continued)

(56) References Cited

U.S. PATENT DOCUMENTS 8,480,798 B1   7/2013   Myers et al.
9,682,344 B1 *  6/2017   Hall ................... F02M 21/0221
(Continued)

FOREIGN PATENT DOCUMENTS

CN      112297891 A  *  2/2021
JP      2014504695 A     2/2014
(Continued)

*Primary Examiner* — Stacy Whitmore
(74) *Attorney, Agent, or Firm* — Hauptman Ham, LLP

(57) ABSTRACT

A vehicle provided with a rechargeable battery, a charging port connected to a charging cable for supplying the battery with electric power of an outside power source, a $CO_2$ recovery device for recovering $CO_2$, a $CO_2$ collection port connected to a collection hose for collecting $CO_2$ from the $CO_2$ recovery device, and a single openable lid covering both the charging port and the $CO_2$ collection port.

9 Claims, 18 Drawing Sheets

(52) U.S. Cl.
CPC ............... *B60L 53/30* (2019.02); *B60S 5/00* (2013.01); *B01D 2257/504* (2013.01); *B60L 2250/16* (2013.01); *B60L 2270/00* (2013.01)

(58) Field of Classification Search
CPC ..... Y02T 10/70; Y02T 10/7072; Y02T 90/12; Y02T 90/14; Y02T 90/16; B62D 25/24; C01B 32/50
See application file for complete search history.

(56) References Cited

U.S. PATENT DOCUMENTS

| | | | |
|---|---|---|---|
| 10,280,882 B2* | 5/2019 | Hall | F02M 21/0296 |
| 2003/0008183 A1* | 1/2003 | Hsu | F17C 11/005 |
| | | | 422/198 |
| 2013/0298532 A1 | 11/2013 | Hamad et al. | |
| 2013/0298761 A1 | 11/2013 | Hamad | |
| 2016/0359214 A1* | 12/2016 | Barton | H01M 8/0656 |
| 2017/0298880 A1* | 10/2017 | Hall | F02M 37/0088 |
| 2018/0236938 A1* | 8/2018 | Ishida | B60Q 1/50 |
| 2019/0381905 A1* | 12/2019 | Winkler | H02J 7/0047 |
| 2020/0101850 A1* | 4/2020 | Harty | B60L 1/02 |
| 2020/0318879 A1* | 10/2020 | Vianello | F25B 45/00 |
| 2021/0062697 A1* | 3/2021 | Yokoyama | F01N 3/206 |

FOREIGN PATENT DOCUMENTS

| | | |
|---|---|---|
| JP | 2014509360 A | 4/2014 |
| JP | 2017178049 A | 10/2017 |

* cited by examiner

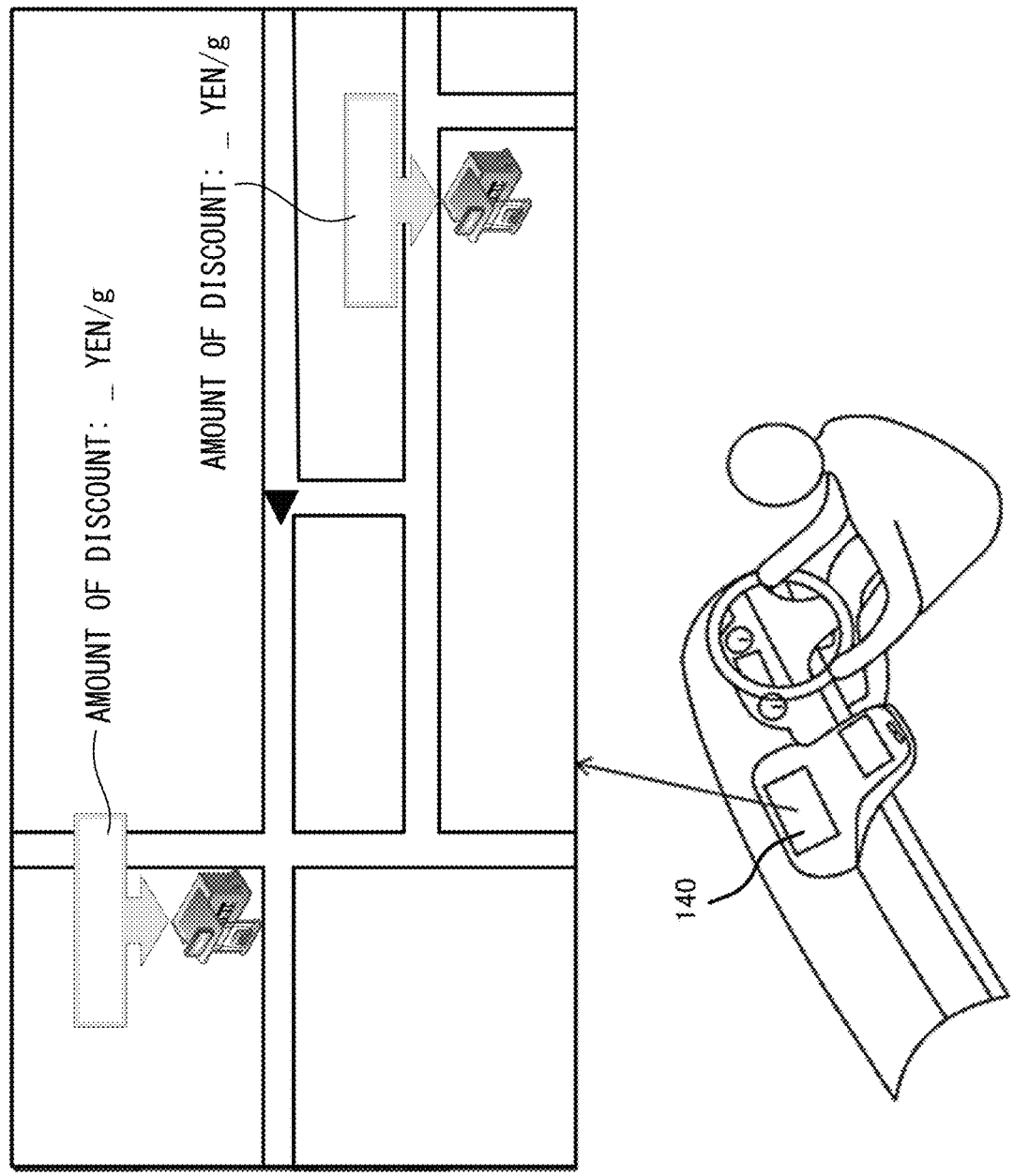

VEHICLE INCLUDING $CO_2$ RECOVERY DEVICE FOR RECOVERING $CO_2$

RELATED APPLICATIONS

The present application claims priority of Japanese Patent Application No. 2019-154762, filed Aug. 27, 2019, the disclosure of which is hereby incorporated by reference herein in its entirety.

FIELD

The present disclosure relates to a vehicle.

BACKGROUND

Japanese Unexamined Patent Publication No. 2014-509360 discloses a conventional vehicle mounting a $CO_2$ (carbon dioxide) recovery device for recovering $CO_2$ in exhaust (exhaust gases) discharged from an internal combustion engine.

SUMMARY

When mounting a $CO_2$ recovery device in for example an EV (electric vehicle) or PHV (plug-in hybrid vehicle) or other vehicle able to supply a vehicle-mounted battery with electric power of an outside power source, the vehicle has to be provided with a charging port for supplying electric power of the outside power source to the battery plus a $CO_2$ collection port for collecting $CO_2$ from the $CO_2$ recovery device. Further, when providing a vehicle with both the charging port and $CO_2$ collection port, how to arrange these at the vehicle has become a problem.

The present disclosure was made focusing on such a problem and has as its object placement of the charging port and $CO_2$ collection port at the vehicle considering driver or worker friendliness in performing the work of charging the battery and the work of collecting $CO_2$ from the $CO_2$ recovery device.

To solve the above problem, the vehicle according to one aspect of the present disclosure is provided with a rechargeable battery, a charging port for supplying the battery with electric power of an outside power source, a $CO_2$ recovery device for recovering $CO_2$, a $CO_2$ collection port for collecting $CO_2$ from the $CO_2$ recovery device, and a single openable lid covering both the charging port and the $CO_2$ collection port.

According to the vehicle according to this aspect of the present disclosure, the charging port and $CO_2$ collection port are covered by a single lid, so when performing the charging work and $CO_2$ collection work, the lid need only be opened and closed once. Further, it is possible to keep down the distance of movement of a worker when connecting a cable and hose to the charging port and $CO_2$ collection port. For this reason, it is possible to lighten the load on a worker when performing the work and as a result possible to improve the worker friendliness.

BRIEF DESCRIPTION OF DRAWINGS

FIG. 21 is a view showing one example of a screen displayed on an onboard display part.

DESCRIPTION OF EMBODIMENTS

Below, embodiments of the present disclosure will be explained in detail with reference to the drawings. Note that, in the following explanation, similar component elements are assigned the same reference notations.

First Embodiment

Figure 1:
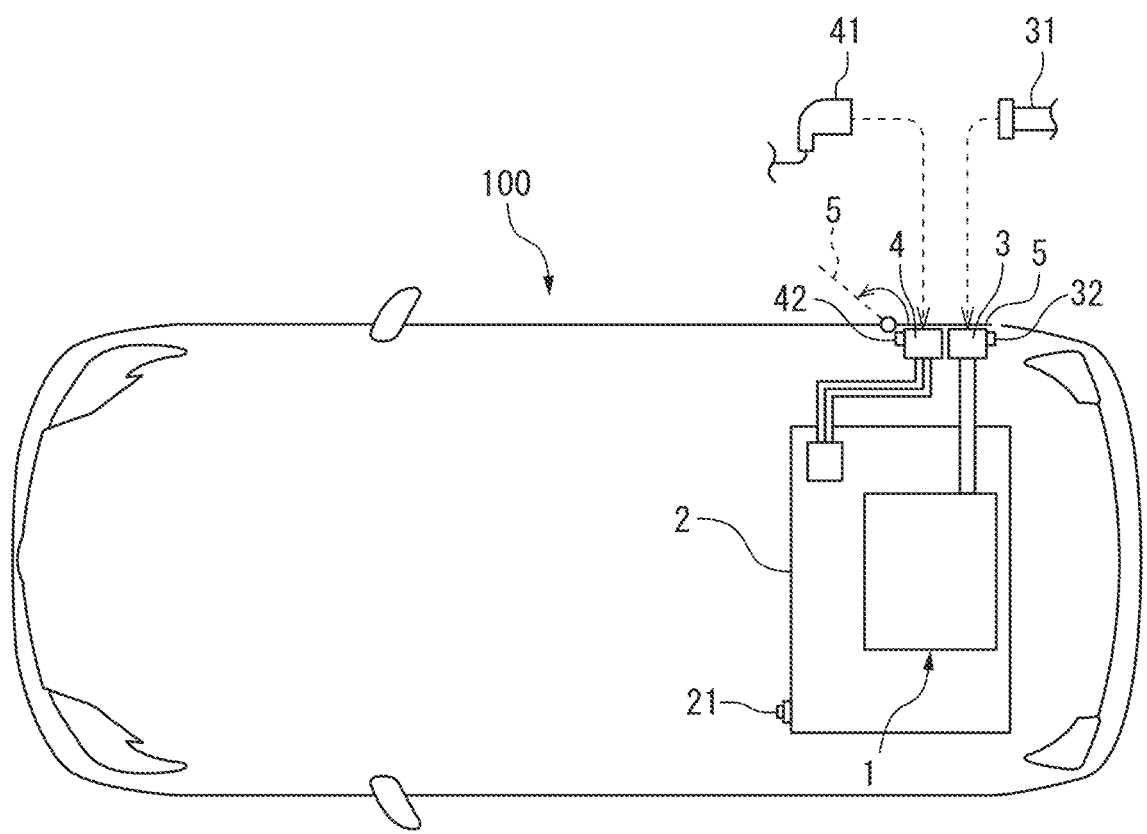
FIG. 1 is a schematic view of the configuration of a vehicle according to a first embodiment of the present disclosure.
Figure 2:
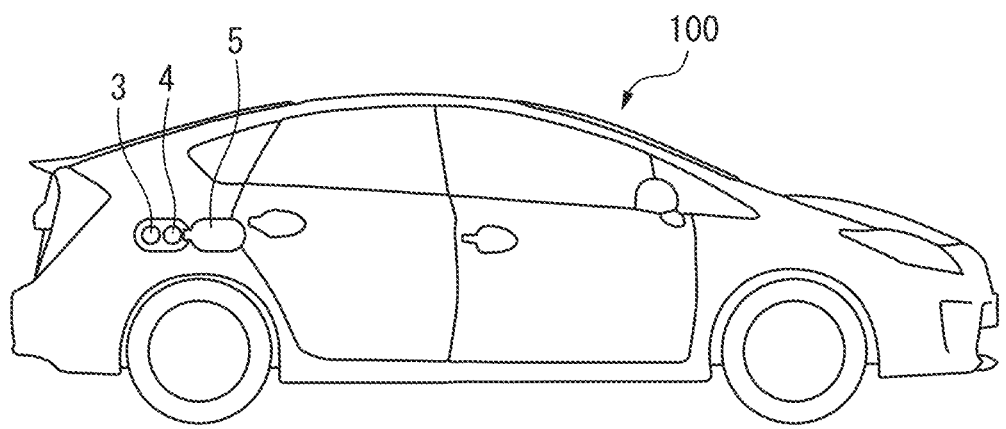
FIG. 2 is a schematic side view of the vehicle according to the first embodiment of the present disclosure.

FIG. 1 is a schematic view of the configuration of a vehicle 100 according to a first embodiment of the present disclosure showing only important parts highly relevant to the present disclosure. FIG. 2 is a schematic side view of the vehicle 100.

The vehicle 100 according to the present embodiment is a so-called electric vehicle which, as shown in FIG. 1, is provided with a $CO_2$ recovery device 1, battery 2, $CO_2$ collection port 3, charging port 4, and lid 5.

The $CO_2$ recovery device 1 is housed inside for example a luggage space of the vehicle 100. The $CO_2$ recovery device 1 according to the present embodiment is configured to be able to recover $CO_2$ in the air (in the atmosphere) and to be able to collect the recovered $CO_2$ from the vehicle from a $CO_2$ collection port 3 provided at one side surface of the vehicle 100 (in present embodiment, side surface at right side in direction of progression of vehicle 100).

The $CO_2$ collection port 3 is configured to enable connection of the collection hose 31 for collecting $CO_2$ recovered by the $CO_2$ recovery device 1 from the vehicle. Note that, in the present embodiment, to detect the connection of the collection hose 31 to the $CO_2$ collection port 3, the $CO_2$ collection port 3 is provided with a collection hose detection sensor 32.

The method of recovery of the $CO_2$ in the air by the $CO_2$ recovery device 1 is not particularly limited, but, for example, the physical adsorption method or physical absorption method, chemical absorption method, cryogenic separation method, etc. explained below may be mentioned.

The physical adsorption method is the method of for example bringing activated carbon or zeolite or another solid adsorbent into contact with the gas containing $CO_2$ (in the present embodiment, air) to thereby make the $CO_2$ be adsorbed at the solid adsorbent and of heating this (or reducing the pressure of this) so as to make the $CO_2$ desorb from the solid adsorbent for recovery.

The physical absorption method is the method of bringing an absorption solution able to dissolve $CO_2$ (for example, methanol or ethanol) into contact with the gas containing $CO_2$ to physically make the $CO_2$ be absorbed by the absorption solution at a high pressure and low temperature and of heating this (or reducing the pressure of this) so as to recover the $CO_2$ from the absorption solution.

The chemical absorption method is the method of bringing an absorption solution able to selectively dissolve $CO_2$ (for example, an amine) into contact with the gas containing $CO_2$ to make the $CO_2$ be absorbed by the absorption solution by a chemical reaction and of heating this so as to make the $CO_2$ disassociate from the absorption solution for recovery.

The cryogenic separation method is a method of compressing and cooling the gas containing $CO_2$ to cause the carbon dioxide to liquefy and of selectively distilling the liquefied carbon dioxide to thereby recover the carbon dioxide. Note that if employing the cryogenic separation method, if the gas containing $CO_2$ contains water vapor, the water vapor will first end up condensing and solidifying, so processing for removing water vapor from the gas containing $CO_2$ is preferably performed in advance.

In the present embodiment, as the method for recovery of the $CO_2$, the physical adsorption method is employed. The $CO_2$ recovery device 1 is configured so as to enable the zeolite used as the solid adsorbent to adsorb the $CO_2$ in the air for recovery. The detailed configuration of the $CO_2$ recovery device 1 will be explained later referring to FIG. 3.

The battery 2, for example, is a nickel cadmium storage battery, a lithium hydrogen storage battery, and lithium ion battery, or other rechargeable secondary battery which is configured to be able to charge electric power of the outside power source from a charging port 4 provided at one side surface of the vehicle 100 so as to adjoin the $CO_2$ collection port 3. The electric power charged at the battery 2 is, for example, supplied to a drive motor (not shown) for generating drive force for driving the vehicle 100. Note that the battery 2 is provided with an SOC sensor 21 for detecting the amount of charging of the battery 2. In the present embodiment, the empty capacity of the battery 2 (below, referred to as the "battery empty capacity") is calculated based on the detection value of the SOC sensor 21.

The charging port 4 is configured so as to be able to connect a charging cable 41 connected to the outside power source for charging the battery with electric power of the outside power source. Note that in the present embodiment, a charging cable detection sensor 42 is provided at the charging port 4 to detect connection of the charging cable 41 to the charging port 4.

The lid 5 is an openable cover covering the outsides of the $CO_2$ collection port 3 and charging port 4 and attached to the vehicle 100. As shown in FIG. 1 and FIG. 2, in the present embodiment, the adjacently arranged $CO_2$ collection port 3 and charging port 4 are covered by the single lid.

In this way, by arranging the $CO_2$ collection port 3 and charging port 4 adjoining each other and covering them by a single lid, it is possible to open and close the lid just one time when performing both the $CO_2$ collection work and charging work. Further, the distance of movement of a worker when connecting both the collection hose 31 and charging cable 41 can be kept down. For this reason, it is possible to lighten the load on the worker performing the $CO_2$ collection work and charging work to improve the worker friendliness when performing this work.

Figure 3:
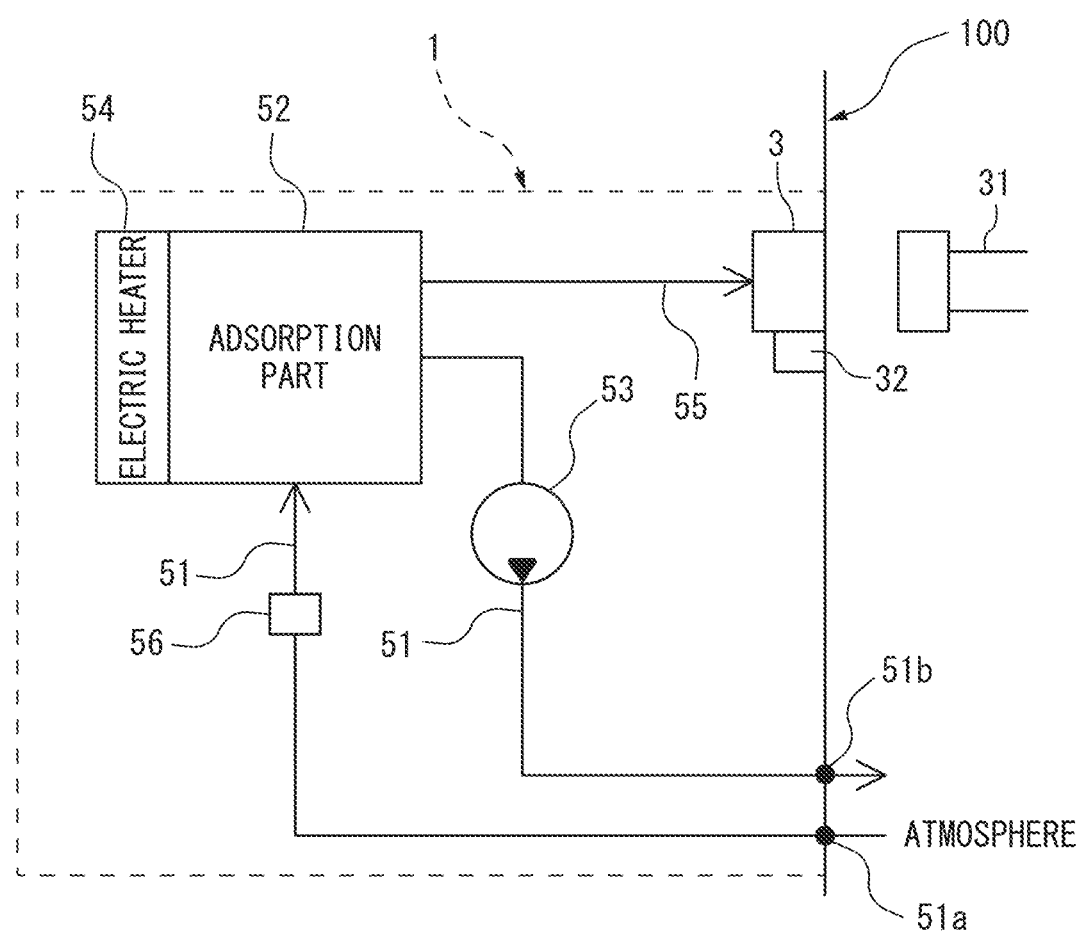
FIG. 3 is a schematic view of the configuration of a $CO_2$ recovery device according to the first embodiment of the present disclosure.

FIG. 3 is a schematic view of the configuration of a $CO_2$ recovery device 1 according to the present embodiment.

As shown in FIG. 3, the $CO_2$ recovery device 1 according to the present embodiment is provided with a gas introduction port 51a, gas discharge port 51b, gas flow passage 51 connecting the gas introduction port 51a and gas discharge port 51b, adsorption part 52 and suction pump 53 arranged on the gas flow passage 51, electric heater 54, collection passage 55 connecting the adsorption part 52 and $CO_2$ collection port 3, and $CO_2$ sensor 56.

The gas introduction port 51a is an inlet for introducing gas containing $CO_2$ to the gas flow passage 51 in the $CO_2$ recovery device 1. In the present embodiment, air outside the vehicle can be introduced from the gas introduction port 51a to the gas flow passage 51. The air introduced from the gas introduction port 51a to the gas flow passage 51 flows through the gas flow passage 51 and is discharged from the gas discharge port 51b to outside the vehicle.

The adsorption part 52 has zeolite as a solid adsorbent inside it and adsorbs the $CO_2$ in the air introduced through the gas circulation passage 51 to the inside of the adsorption part 52. The air reduced in $CO_2$ concentration due to adsorption of $CO_2$ by the adsorption part 52 flows through the gas circulation passage 51 at the downstream side from the adsorption part 52 and is discharged from the gas discharge port 51b to outside the vehicle.

A suction pump 53 is provided at the gas flow passage 51 at the downstream side from the adsorption part 52. By driving the suction pump 53, the air outside of the vehicle is forcibly introduced from the gas introduction port 51a to the gas flow passage 51 and in turn the inside of the adsorption part 52 and air reduced in concentration of $CO_2$ inside the adsorption part 52 is forcibly sucked out from the inside of the adsorption part 52 and discharged from the gas discharge port 51b through the gas flow passage 51 at the downstream side from the adsorption part 52.

The electric heater 54 is provided near the adsorption part 52 so as to be able to heat the adsorption part 52. The electric heater 54 is driven and heats the adsorption part 52 when taking out $CO_2$ recovered by the $CO_2$ recovery device 1 to the outside of the vehicle, that is, when making $CO_2$ adsorbed at the solid adsorbent of the adsorption part 52 desorb from the solid adsorbent.

The collection passage 55 is a passage for collecting the $CO_2$ adsorbed at the solid adsorbent of the adsorption part 52 from the $CO_2$ collection port 3.

As explained above, $CO_2$ collection port 3 is provided with a collection hose detection sensor 32 detecting connection of the collection hose 31 to the $CO_2$ collection port 3. In the present embodiment, when the collection hose 31 is connected to the $CO_2$ collection port 3, the adsorption part 52 is heated by the electric heater 54. Due to this, $CO_2$ made to desorb from the solid adsorbent of the adsorption part 52 is sucked from the adsorption part 52 through the collection hose 31 and taken out to outside the vehicle.

The $CO_2$ sensor 56 is provided in the gas flow passage 51 at an upstream side from the adsorption part 52 and detects the flow rate of the air introduced to the adsorption part 52 and the $CO_2$ concentration in the air. Based on the air flow and $CO_2$ concentration detected by this $CO_2$ sensor 56, the amount of $CO_2$ adsorbed at the adsorption part 52, that is, the amount of $CO_2$ recovered by the $CO_2$ recovery device 1 (below, referred to as the "amount of $CO_2$ recovery"), can be calculated.

The above-explained vehicle 100 according to the present embodiment is provided with the rechargeable battery 2, the charging port 4 for supplying the battery 2 with electric power of an outside power source, the $CO_2$ recovery device 1 for recovering the $CO_2$, the $CO_2$ collection port 3 for collecting $CO_2$ from the $CO_2$ recovery device 1, and the single openable lid 5 covering both the charging port 4 and $CO_2$ collection port 3.

By arranging the $CO_2$ collection port 3 and charging port 4 adjoining each other and covering these by a single lid, it is possible to open and close the lid only once when performing the $CO_2$ collection work and charging work. Further, it is possible to keep down the distance of movement of a worker when connecting the collection hose 31 and charging cable 41. For this reason, it is possible to lighten the load of the worker when performing the $CO_2$ collection work and charging work to improve the worker friendliness at the time of the work.

Second Embodiment

Next, a second embodiment of the present disclosure will be explained. The present embodiment differs from the first embodiment on the point of the $CO_2$ collection port 3 and charging port 4 being joined. Below, this point of difference will be focused on for the explanation.

Figure 4A:
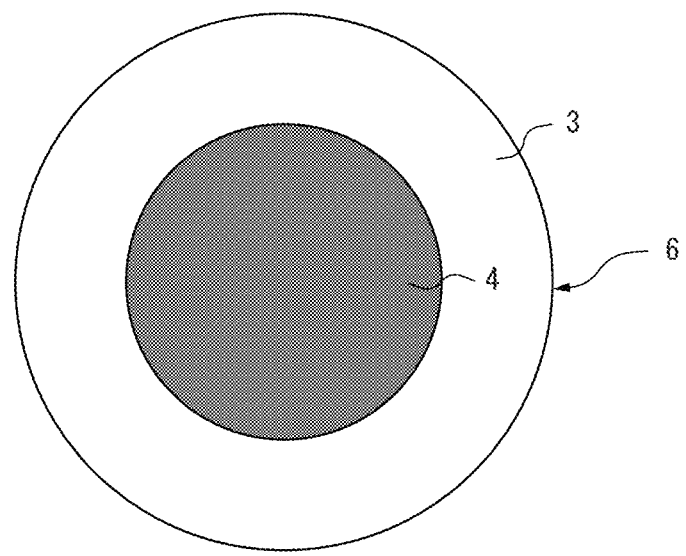
FIG. 4A is a view showing an example of an integral type connection port comprising a $CO_2$ collection port and charging port which are integrally joined.
Figure 4B:
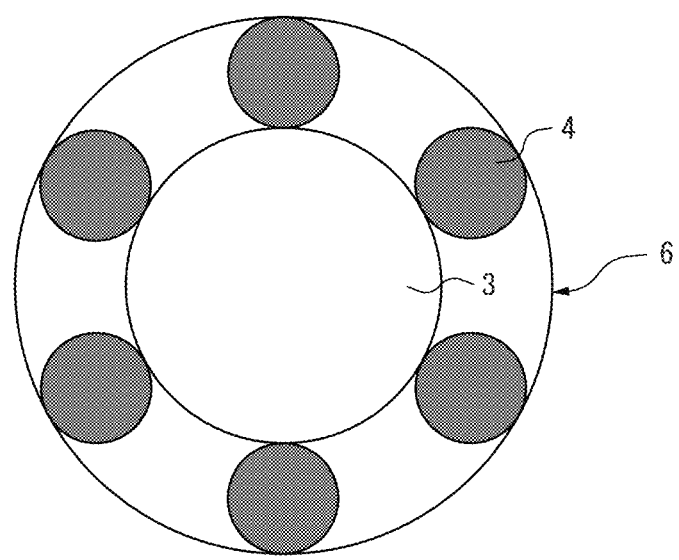
FIG. 4B is a view showing an example of an integral type connection port comprising a $CO_2$ collection port and charging port which are integrally joined.

FIG. 4A and FIG. 4B are views showing an example of an integral type connection port 6 comprised of the $CO_2$ collection port 3 and charging port 4 which are integrally joined.

As shown in FIG. 4A and FIG. 4B, in the present embodiment, the $CO_2$ collection port 3 and charging port 4 are made an integral type connection port 6 which integrally joins the same. At this integral type connection port 6, an integral cable type hose (not shown) comprised of the collection hose 31 and charging cable 41 joined together can be connected.

The integral type connection port 6, for example, as shown in FIG. 4A, can be made a shape with the $CO_2$ collection port 3 formed around the charging port 4. Further, for example, as shown in FIG. 4B, it may be made a shape with the charging port 4 formed around the $CO_2$ collection port 3.

The charging port 4 and $CO_2$ collection port 3 of the above explained vehicle 100 according to the present embodiment is made the integral type connection port 6 comprised of the charging port 4 and $CO_2$ collection port 3 which are joined together. The integral type connection port 6 is configured to enable connection with an integral cable type hose comprised of the charging cable 41 and the collection hose 31.

Due to this, the work of connection of the collection hose 31 and charging cable 41 can be performed once, so it is possible to further improve the worker friendliness in both the $CO_2$ collection work and the charging work of the battery 2 from the $CO_2$ recovery device 1.

Third Embodiment

Next, a third embodiment of the present disclosure will be explained. The present embodiment differs from the above embodiments on the point relating to the content of the processing performed when performing the $CO_2$ collection work and charging work. Below, one example of the content of the processing performed when performing the different work at a facility 200 able to perform the $CO_2$ collection work and charging work (below, referred to as a "service station") will be explained focusing on the point of difference.

Figure 5:
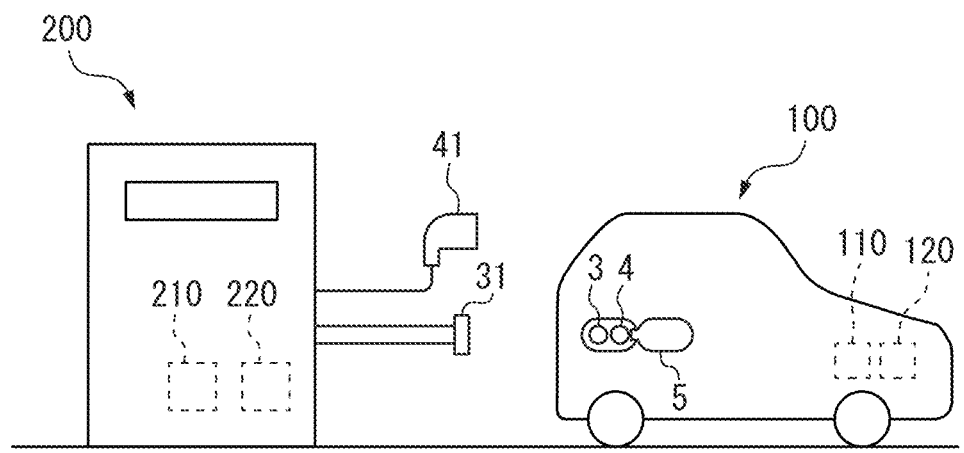
FIG. 5 is a schematic view of the configuration of a vehicle and service station according to a third embodiment of the present disclosure.

FIG. 5 is a schematic view of the configuration of the vehicle 100 and service station 200 according to the present embodiment.

The vehicle 100 is further provided with a vehicle-side communication device 110 and a vehicle-side control device 120 for controlling the $CO_2$ recovery device 1 etc.

The vehicle-side communication device 110 is a wireless communication device configured to be able to wirelessly communicate with a later explained service station-side communication device 210 provided at the service station 200 side and is provided with an antenna and a signal processing circuit performing various types of processing relating to wireless communication such as the modulation and demodulation of a wireless signal.

The vehicle-side control device 120 is a microcomputer provided with a central processing unit (CPU), read only memory (ROM), random access memory (RAM), input port, and output port connected with each other by a bidirectional bus.

The vehicle-side control device 120 receives as input signals from the above-mentioned SOC sensor 21 or collection hose sensor 32, charging cable detection sensor 42, $CO_2$ sensor 56, etc. The vehicle-side control device 120 calculates the empty capacity of the battery based on a signal from the SOC sensor 21. Further, the vehicle-side control device 120 detects whether the collection hose 31 and charging cable 41 are connected to the $CO_2$ collection port 3 and charging port 4 based on signals from the collection hose detection sensor 32 and charging cable detection sensor 42. At that time, it utilizes the electric power supplied from an outside power source to drive the electric heater 54 to heat the adsorption part 52 and thereby make the $CO_2$ adsorbed at the solid adsorbent of the adsorption part 52 desorb from the solid adsorbent. Further, the vehicle-side control device 120 calculates the amount of $CO_2$ recovery based on a signal from the $CO_2$ sensor 56. Further, the vehicle-side control device 120 drives the suction pump 53 during driving of the vehicle 100 etc. to introduce the air outside the vehicle inside of the adsorption part 52.

The service station 200 is provided with a service station-side communication device 210 and a service station-side control device 220.

The service station-side communication device 210 is a wireless communication device configured to be able to wirelessly communicate with the vehicle-side communication device 110 and is provided with an antenna and a signal processing circuit performing various types of processing relating to wireless communication of modulation and demodulation of a wireless signal.

The service station-side control device 220 is a microcomputer provided with a central processing unit (CPU), read only memory (ROM), random access memory (RAM), input port, and output port connected with each other by a bidirectional bus.

The service station-side control device 220 controls the amount of collection of $CO_2$ from the $CO_2$ recovery device 1 and the amount of supply of electric power to the battery 2 when performing the $CO_2$ collection work and charging work in a coordinated manner.

The various type of information (data) generated at the service station-side control device 220 received by the vehicle-side communication device 110 from the service station-side communication device 210 is input through the vehicle-side communication device 110 to the vehicle-side control device 120. Further, the various type of information (data) generated at the vehicle-side control device 120 received by the service station-side communication device 210 from the vehicle-side communication device 110 is input through the service station-side communication device 210 to the service station-side control device 220.

Figure 6:
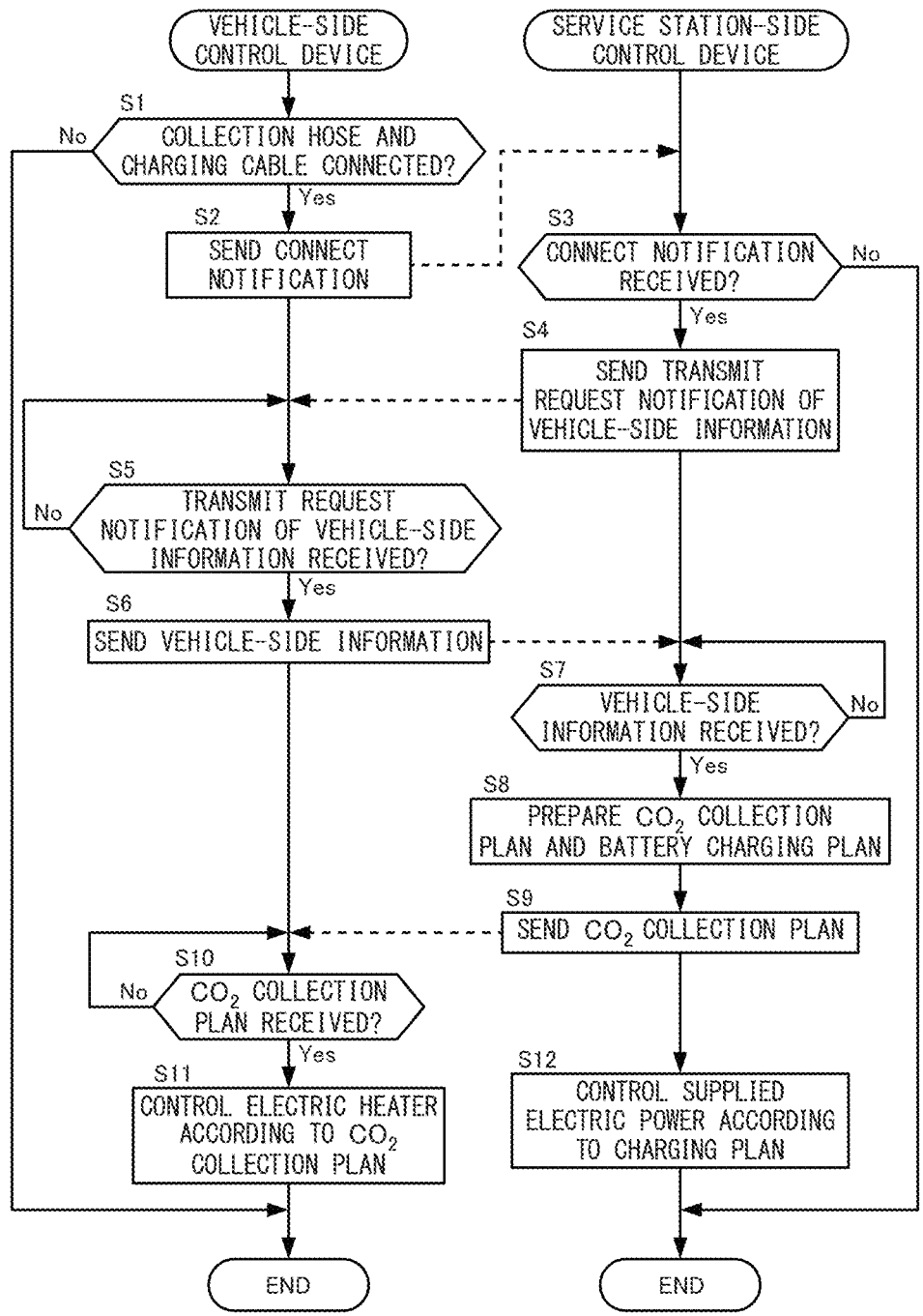
FIG. 6 is a flow chart explaining the content of processing according to the third embodiment of the present disclosure performed by the vehicle-side control device and service station-side control device when performing $CO_2$ collection work and charging work at a service station.

FIG. 6 is a flow chart for explaining the content of processing performed by the vehicle-side control device 120 and service station-side control device 220 when performing the $CO_2$ collection work and charging work at the service station 200.

At step S1, the vehicle-side control device 120 detects if the collection hose 31 and charging cable 41 have been connected to the $CO_2$ collection port 3 and charging port 4.

The vehicle-side control device 120 proceeds to the processing of step S2 if the collection hose 31 and charging cable 41 have been connected to the $CO_2$ collection port 3 and charging port 4. On the other hand, the vehicle-side control device 120 ends the current processing if the collection hose 31 and charging cable 41 have not been connected to the $CO_2$ collection port 3 and charging port 4.

At step S2, the vehicle-side control device 120 sends a connect notification for notifying the service station 200 side that the collection hose 31 and charging cable 41 have been connected to the $CO_2$ collection port 3 and charging port 4 to the service station-side communication device 210 through the vehicle-side communication device 110.

At step S3, the service station-side control device 220 judges if it has received the connect notification. The service station-side control device 220 proceeds to step S4 if receiving the connect notification. On the other hand, the service station-side control device 220 ends the current processing if not receiving the connect notification.

At step S4, the service station-side control device 220 sends a transmit request notification of the vehicle-side information through the service station-side communication device 210 to the vehicle-side communication device 110.

At step S5, the vehicle-side control device 120 judges if it has received a transmit request notification of vehicle-side information. The vehicle-side control device 120 proceeds to the processing of step S6 if receiving the transmit request notification of the vehicle-side information. On the other hand, the vehicle-side control device 120 again judges if it has received the transmit request notification of the vehicle-side information after waiting for a predetermined time if not receiving the transmit request notification of the vehicle-side information. Note that, when not able to receive the transmit request notification even when a certain time has elapsed from when sending the connect notification, it is possible to resend the connect notification or end the processing once.

At step S6, the vehicle-side control device 120 sends the vehicle-side information through the vehicle-side communication device 110 to the service station-side communication device 210. The vehicle-side information includes the amount of $CO_2$ recovery and empty capacity of the battery and other data calculated by the vehicle-side control device 120.

At step S7, the service station-side control device 220 judges if it has received the vehicle-side information. The service station-side control device 220 proceeds to the processing of step S8 if receiving the vehicle-side information. On the other hand, the service station-side control device 220 again judges if it has received the vehicle-side information after waiting for a predetermined interval if not receiving the vehicle-side information. Note that, when not able to receive the vehicle-side information even after a certain time elapses from when sending the transmit request notification of the vehicle-side information, it is possible to resend the transmit request notification of the vehicle-side information or to end the processing once.

At step S8, the service station-side control device 220 prepares a $CO_2$ collection plan and charging plan of the battery 2 based on the amount of $CO_2$ recovery and battery empty capacity contained in the vehicle-side information.

Here, in the present embodiment, when collecting $CO_2$ from the $CO_2$ recovery device 1, the electric heater 54 is driven to heat the adsorption part 52 so as to make $CO_2$ desorb from the solid adsorbent of the adsorption part 52.

For this reason, the $CO_2$ collection plan is a plan setting output, drive time, etc. of the electric heater 54 so as to enable recovery of the $CO_2$ recovered by the $CO_2$ recovery device 1 (that is, $CO_2$ of the amount of $CO_2$ recovery).

Further, the charging plan is made a plan setting for example the amount of charging per unit time and charging time period etc. so as to enable the amount of electric power required for making the amount of charging of the battery 2 the amount of charging which the worker demands plus the amount of electric power consumed by the electric heater 54 during the $CO_2$ collection work to be supplied to the battery 2, for example, the amount of charging per unit time and charging time period etc.

Note that in the present embodiment, the plans are prepared so that the charging time and $CO_2$ collection time become the shortest. That is, the plans are prepared so that the time of completion of charging and the time of completion of $CO_2$ collection become the earliest times. However, the disclosure is not limited to this. The plans may also be prepared so that the time of completion of charging and the time of completion of $CO_2$ collection become the same times.

At step S9, the service station-side control device 220 sends the $CO_2$ collection plan through the service station-side communication device 210 to the vehicle-side communication device 110.

At step S10, the vehicle-side control device 120 judges if the $CO_2$ collection plan has been received. The vehicle-side control device 120 proceeds to the processing of step S11 if receiving the $CO_2$ collection plan. On the other hand, if not receiving $CO_2$ collection plan, the vehicle-side control device 120 again judges if it has received the $CO_2$ collection plan after a predetermined interval has passed. Note that, the device may resend the vehicle-side information or end the processing once if not able to receive the $CO_2$ collection plan even after a certain time has elapsed from when sending the vehicle-side information.

At step S11, the vehicle-side control device 120 controls the output and drive time period of the electric heater 54 to make the $CO_2$ adsorbed at the solid adsorbent of the adsorption part 52 be desorbed from the solid adsorbent in accordance with the $CO_2$ collection plan.

At step S12, the service station-side control device 220 performs charging of the battery 2 in accordance with the charging plan and sucks out $CO_2$ from the adsorption part 52 to collect $CO_2$ recovered by the $CO_2$ recovery device 1 in accordance with the $CO_2$ collection plan.

Figure 7:
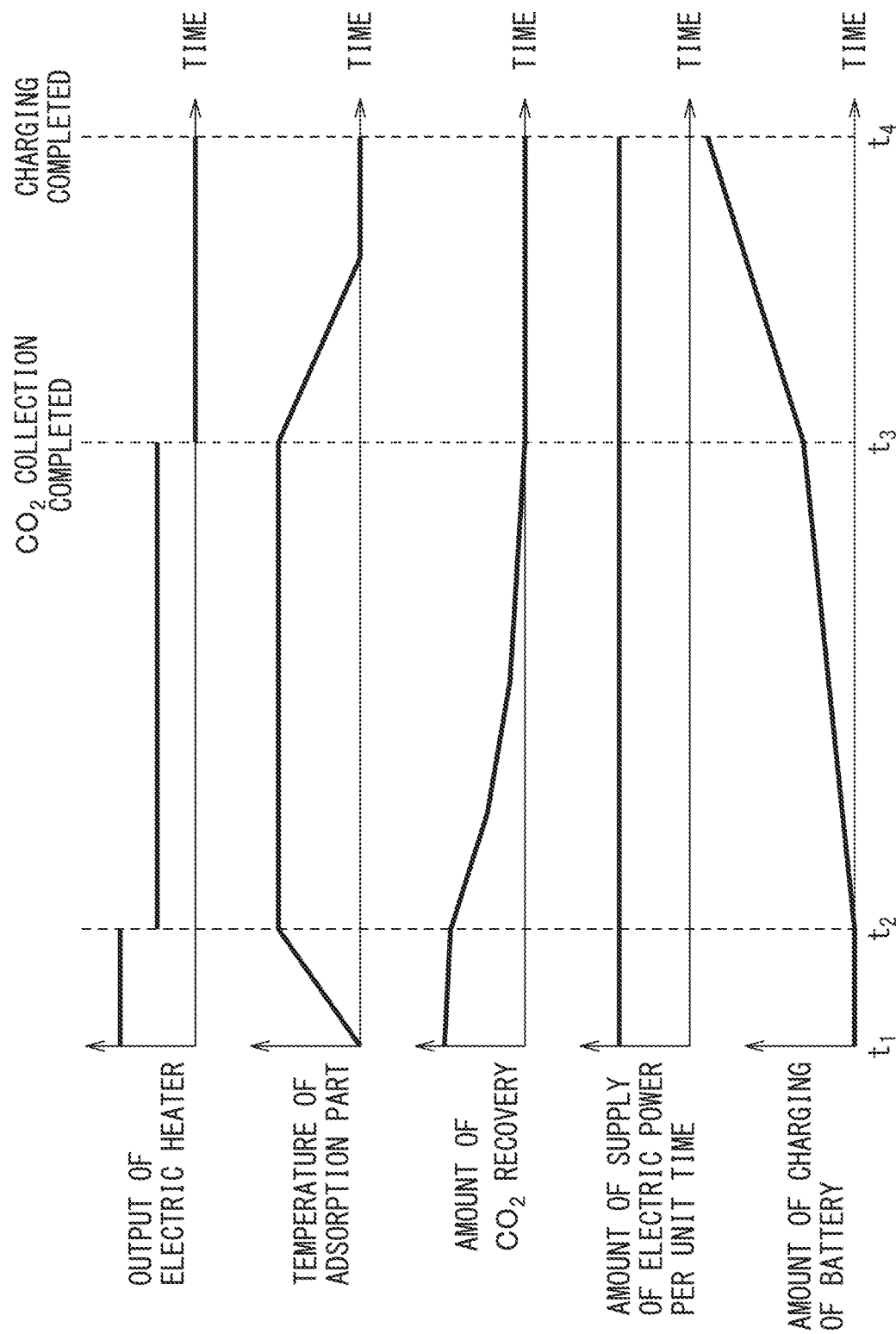
FIG. 7 is a time chart explaining one example of the operation when preparing a $CO_2$ collection plan and battery charging plan whereby the time of completion of $CO_2$ collection and the time of completion of charging of the battery become the earliest times.

FIG. 7 is a time chart for explaining one example of the operation when preparing the $CO_2$ collection plan and charging plan so that the time of completion of $CO_2$ collection and the time of completion of charging respectively become the earliest times.

At the time t1, charging of the battery 2 and collection of $CO_2$ are started in accordance with the plans. In the example shown in FIG. 7, the charging plan is made a plan making the amount of supply of electric power to the battery 2 per unit time constant until the charging is completed.

In the period from the time t1 to the time t2, to make the temperature of the adsorption part 52 quickly rise, the electric heater 54 is driven by the maximum output using all of the electric power supplied to the battery 2 in accordance with the $CO_2$ collection plan. Due to this, the temperature of the adsorption part 52 gradually rises. The $CO_2$ gradually desorbing from the adsorption part 52 along with the rise of temperature of the adsorption part 52 is collected through the collection hose 31 and the amount of $CO_2$ recovery (amount of $CO_2$ in adsorption part 52) gradually decreases.

At the time t2, to maintain the temperature of the adsorption part 52 which was raised in temperature at a certain level, part of the electric power supplied to the battery 2 is used to drive the electric heater 54 by an output lower than the maximum output in accordance with the $CO_2$ collection plan.

Due to this, at the time t2 on, the excess electric power not used for driving the electric heater 54 is charged to the battery 2, so the amount of charging of the battery 2 gradually increases. Further, at the time t2 and on, the temperature of the adsorption part 52 is maintained at a certain temperature whereby the $CO_2$ desorbed from the solid adsorbent of the adsorption part 52 is collected through the collection hose 31. Due to this, the amount of $CO_2$ recovery decreases. At this time, the amount of desorption of $CO_2$ per unit time desorbed from the solid adsorbent of the adsorption part 52 (below, referred to as the "amount of $CO_2$ desorption") basically depends on the temperature of the adsorption part 52 and the amount of adsorption of $CO_2$ adsorbed at the solid adsorbent (below, referred to as the "amount of $CO_2$ adsorption"). The higher the temperature of the adsorption part 52 and, further, the greater the amount of $CO_2$ adsorption, the greater this tends to become. For this reason, at the time t2 and on, the temperature of the adsorption part 52 is maintained at a certain temperature, so the amount of $CO_2$ desorption basically depends on the amount of $CO_2$ adsorption (amount of $CO_2$ recovery). Along with the desorption of $CO_2$ from the solid adsorbent, the amount of $CO_2$ adsorption decreases and the amount of $CO_2$ desorption decreases, so as shown in FIG. 7, along with the elapse of time from the time t2 and the approach to the time t3, the amount of decrease of the amount of $CO_2$ recovery becomes slower.

At the time t3, according to the $CO_2$ collection plan, drive of the electric heater 54 is made to stop. By following the plans, basically, at the timing of this time t3, the amount of $CO_2$ recovery becomes zero and collection of $CO_2$ from the $CO_2$ recovery device 1 is completed. At the time t3 and on, along with the drive of the electric heater 54 being stopped, all of the electric power supplied from the outside power source is charged to the battery 2, so the amount of charging of the battery 2 quickly increases.

At the time t4, in accordance with the charging plan, the supply of electric power to the battery 2 is stopped. By following the plans, basically, at the timing of this time t4, the charging of the battery 2 is completed.

Figure 8:
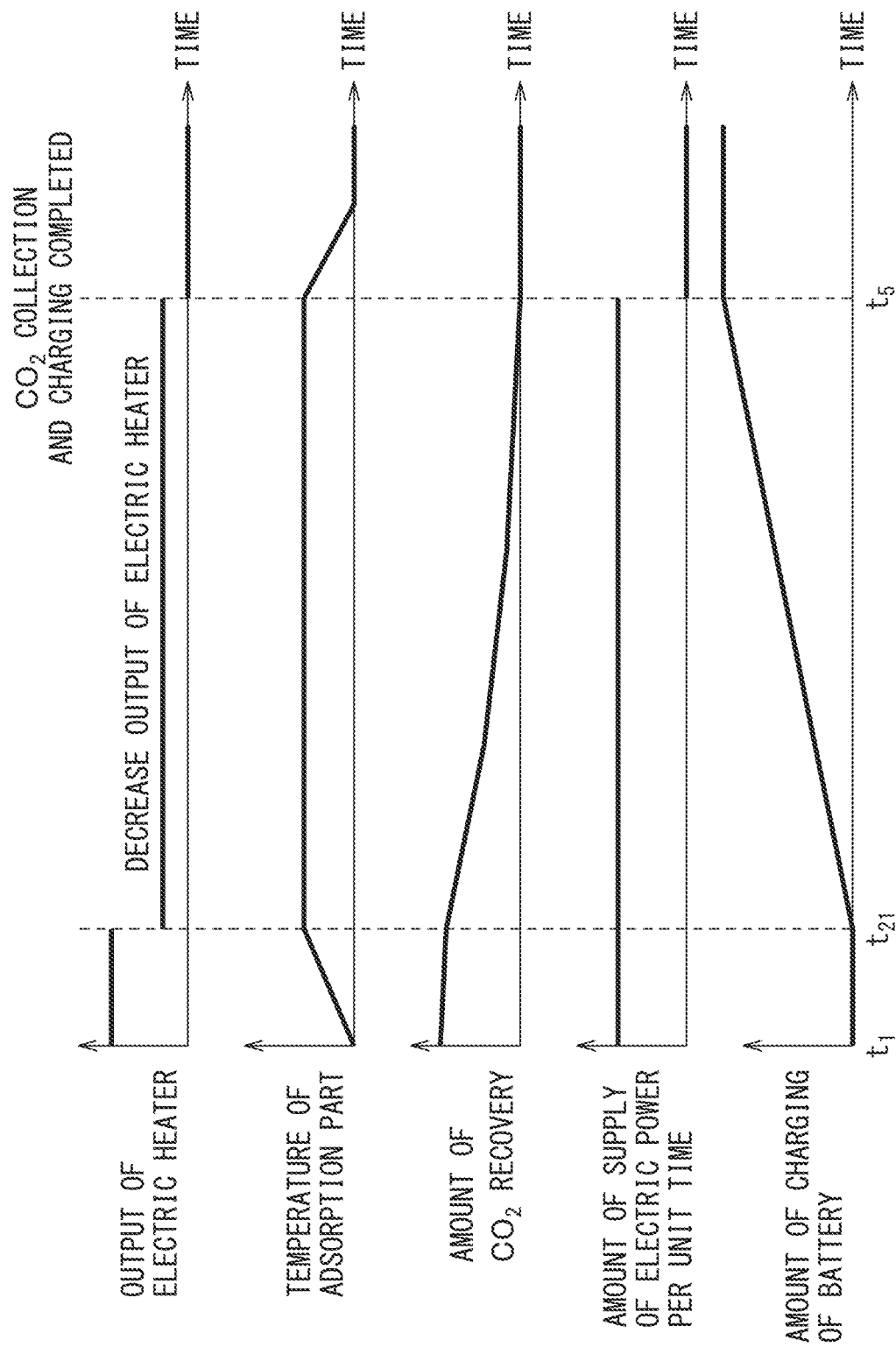
FIG. 8 is a time chart explaining one example of the operation when preparing a $CO_2$ collection plan and the battery charging plan whereby the time of completion of $CO_2$ collection from the $CO_2$ recovery device and the time of completion of charging of the battery become the same times.

FIG. 8 is a time chart for explaining one example of the operation in the case of preparing the $CO_2$ collection plan and charging plan so that the time of completion of $CO_2$ collection and the time of completion of charging become the same times.

In the example shown in FIG. 8 as well, in the same way as the above-mentioned FIG. 7, at the time t1, in accordance with the plans, charging of the battery 2 and collection of $CO_2$ are respectively started. At this time, in the example shown in FIG. 8, to make the time of completion of $CO_2$ collection and the time of completion of charging the same times, the time period for driving the electric heater 54 at the maximum output is shortened compared with the above-mentioned case of FIG. 7 and the output of the electric heater 54 is maintained at a low output. Due to this, at the time t21 and on, the temperature of the adsorption part 52 is maintained at a certain temperature lower than the above-mentioned case of FIG. 7 to keep down the amount of $CO_2$ desorbed from the adsorption part 52 and make the time of completion of $CO_2$ collection and the time of completion of charging the same time of the time t5.

The above-mentioned vehicle 100 according to the present embodiment is further provided with the electric heater 54 for heating the $CO_2$ recovery device 1 and the vehicle-side control device 120 (control device). The vehicle-side control device 120 is configured to drive the electric heater 54 by the electric power supplied from the outside power source to heat the $CO_2$ recovery device 1.

Due to this, when collecting $CO_2$ from the $CO_2$ recovery device 1, the service station 200 side does not have to heat the $CO_2$ recovery device 1. It is sufficient to just supply electric power, so the facilities at the service station 200 side can be simplified.

Further, the service station 200 according to the present embodiment is provided with a service station-side communication device 210 receiving vehicle-side information including an empty capacity of the battery and the amount of $CO_2$ recovery of the $CO_2$ recovery device 1 sent from the vehicle-side communication device 110 mounted in the vehicle 100 and a service station-side control device 220 configured to control the amount of charging of the battery 2 and the amount of collection of $CO_2$ from the $CO_2$ recovery device 1 based on the vehicle-side information so that the time of completion of charging of the battery 2 and the time of completion of collection of $CO_2$ from the $CO_2$ recovery device 1 become the same times.

In this way, by making the time of completion of charging of the battery 2 and the time of completion of collection of $CO_2$ from the $CO_2$ recovery device 1 the same, it is possible to eliminate the occurrence of a wait time etc. after one is completed, so it is possible to keep the occurrence of a wait time from causing a vehicle occupant or other worker to feel dissatisfied.

Fourth Embodiment

Next, a fourth embodiment of the present disclosure will be explained. The present embodiment differs from the above-mentioned embodiments on the point of the worker performing the $CO_2$ collection work and charging work being able to be provided with various types of information. Below, this point of difference will be focused on in the explanation.

Figure 9:
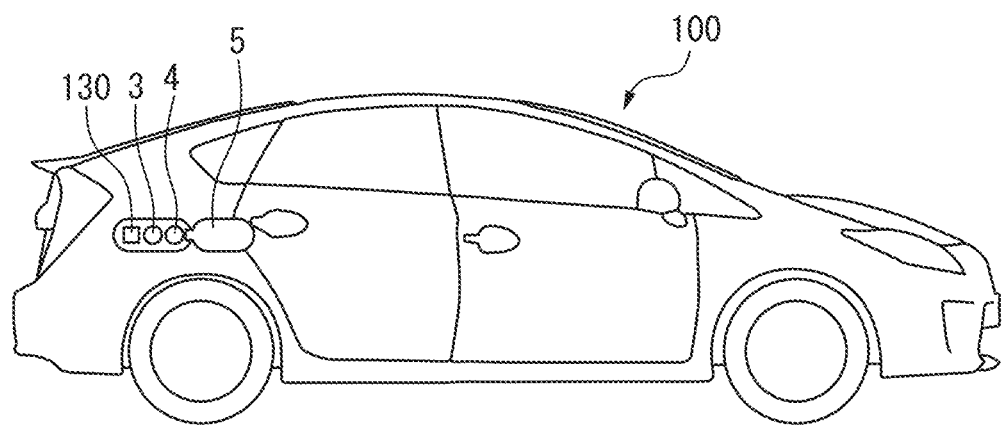
FIG. 9 is a schematic side view of the vehicle according to a fourth embodiment of the present disclosure.

FIG. 9 is a schematic side view of the vehicle 100 according to the present embodiment.

The vehicle 100 according to the present embodiment is provided with a display part 130 for providing various types of information to a worker performing the $CO_2$ collection work and charging work.

The display part 130 is, for example, any of various types of displays such as a touch panel. The display part 130 is placed at a position which the worker can view. In the present embodiment, the display part 130, as shown in FIG. 9, is arranged at a position adjoining the $CO_2$ collection port 3 and charging port 4 so as to enable a worker to view it when the lid 5 is opened.

The display part 130 displays information corresponding to a signal output from the vehicle-side control device 120 (for example, text information or graphic information). Further, in the present embodiment, the display part 130 is made able to display the time of completion of $CO_2$ collection and time of completion of charging. Due to this, a worker can obtain a grasp of the time of the end of the work when performing both $CO_2$ collection work and charging work. For this reason, the worker friendliness when performing the $CO_2$ collection work and charging work can be further improved.

Figure 10:
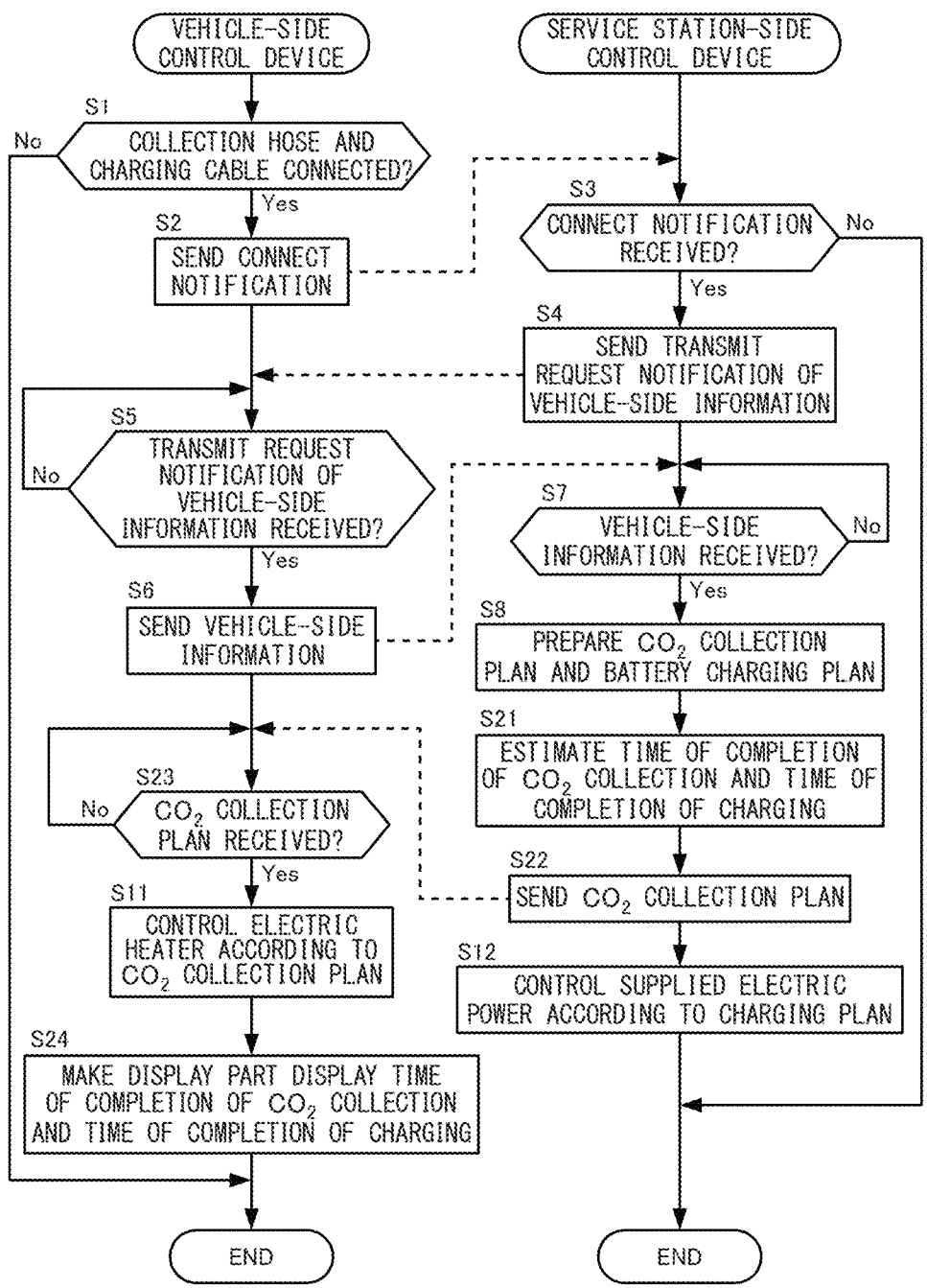
FIG. 10 is a flow chart explaining the content of processing according to the fourth embodiment of the present disclosure performed by the vehicle-side control device and service station-side control device when performing $CO_2$ collection work and the battery charging work at a service station.

FIG. 10 is a flow chart explaining the content of the processing according to the present embodiment performed by the vehicle-side control device 120 and service station-side control device 220 when the $CO_2$ collection work and charging work are performed at the service station 200. Note that, in FIG. 10, the content of the processing of step S1 to step S8, step S11, and step S12 is similar to the third embodiment, so here the explanation will be omitted.

As shown in the flow chart of FIG. 10, the service station-side control device 220 estimates the time of completion of $CO_2$ collection when collecting $CO_2$ in accordance with the $CO_2$ collection plan based on the amount of $CO_2$ recovery and estimates the time of completion of charging when charging the battery 2 in accordance with the charging plan based on the empty capacity of the battery and sends the time of completion of $CO_2$ collection and the time of completion of charging together with the $CO_2$ collection plan to the vehicle-side control device 120 (S21, S22).

Figure 11:
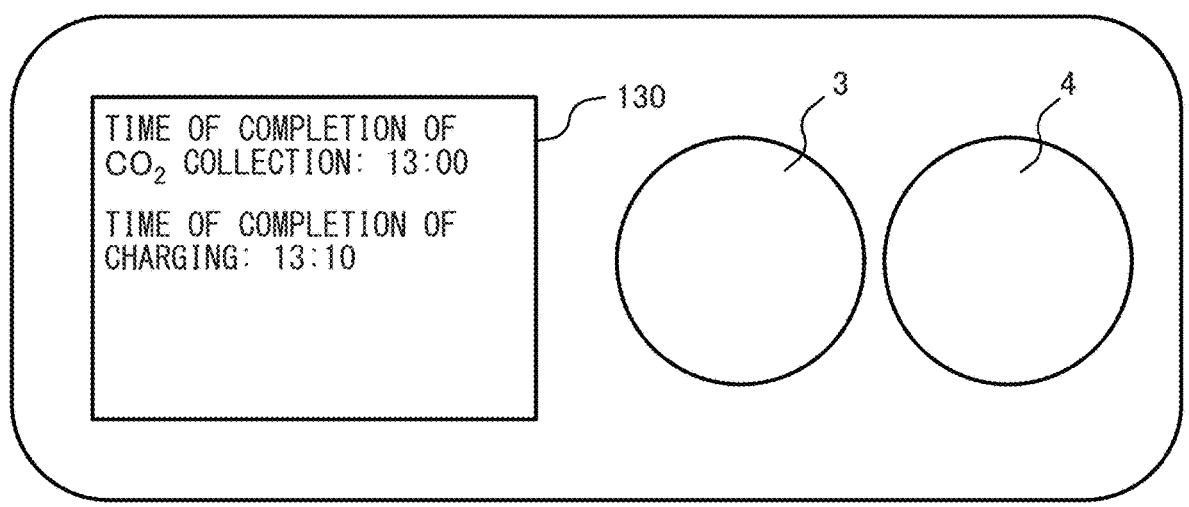
FIG. 11 shows one example of a screen displaying the time of completion of $CO_2$ collection from the $CO_2$ recovery device and the time of completion of charging of the battery.

Further, the vehicle-side control device 120, for example, as shown in FIG. 11, makes the display part 130 display the time of completion of $CO_2$ collection and the time of completion of charging received together with the $CO_2$ collection plan (at S23, Yes, S24).

The above-explained vehicle 100 according to the present embodiment is further provided with a display part 130 for providing information to a worker performing the work of charging the battery 2 and work of collecting $CO_2$ from the $CO_2$ recovery device 1 and a vehicle-side communication device 110 configured to be able to communicate with a service station 200 for charging the battery 2 and for collecting $CO_2$ from the $CO_2$ recovery device 1. The vehicle-side control device 120 is configured so as to make the display part 130 display information relating to the time of completion of charging of the battery 2 and the time of completion of collection of $CO_2$ from the $CO_2$ recovery device received from the service station 200 side through the vehicle-side communication device 110.

Due to this, a worker can obtain a grasp of the times of ending the work when performing the $CO_2$ collection work from the $CO_2$ recovery device 1 and charging work of the battery 2. For this reason, the worker friendliness in the $CO_2$ collection work from the $CO_2$ recovery device 1 and charging work of the battery 2 can be further improved. In particular, in the present embodiment, the display part 130 is arranged at a position adjoining the $CO_2$ collection port 3 and charging port 4, so the display part 130 can be viewed during the $CO_2$ collection work and the charging work of the battery 2. For this reason, it is possible to easily check various types of information, so it is possible to further improve the worker friendliness when performing the work.

Note that in the present embodiment, the display part 130 provided at the vehicle 100 was made to display the time of completion of $CO_2$ collection and the time of completion of charging, but the disclosure is not limited to this. A mobile terminal of an occupant of the vehicle 100 or a worker may be used to communicate with the service station-side communication device 210 to make the mobile terminal receive the time of completion of $CO_2$ collection and the time of completion of charging and make the mobile terminal display the time of completion of $CO_2$ collection and the time of completion of charging.

That is, the mobile terminal may be configured provided with a display part for displaying information, a communication device configured to be able to communicate with a service station 200 for charging the battery 2 and collecting $CO_2$ from the $CO_2$ recovery device 1, and a processing device configured to make the display part display information relating to the time of completion of charging of the battery 2 and the time of completion of $CO_2$ collection from the $CO_2$ recovery device 1 received from the service station 200 side through the communication device. In the mobile terminal, the display part can, for example, be made any of various types of display such as a touch panel. Further, the communication device can, for example, be made a wireless communication device provided with an antenna and a signal processing circuit performing various types of processing relating to wireless communication such as modulation and demodulation of the wireless signal. Further, the processing device can be made a microcomputer provided with a central processing unit (CPU), read only memory (ROM), random access memory (RAM), input port, and output port connected with each other by a bidirectional bus.

Fifth Embodiment

Next, a fifth embodiment of the present disclosure will be explained. The present embodiment differs from the fourth embodiment on the point of making the display 130 display in a selectable state whether to complete both charging of the battery 2 and collection of $CO_2$ or end the charging and collection of $CO_2$ at the point of time when either of these is completed when the time of completion of charging and the time of completion of $CO_2$ collection differ. Below, this point of difference will be focused on in the explanation.

Figure 12:
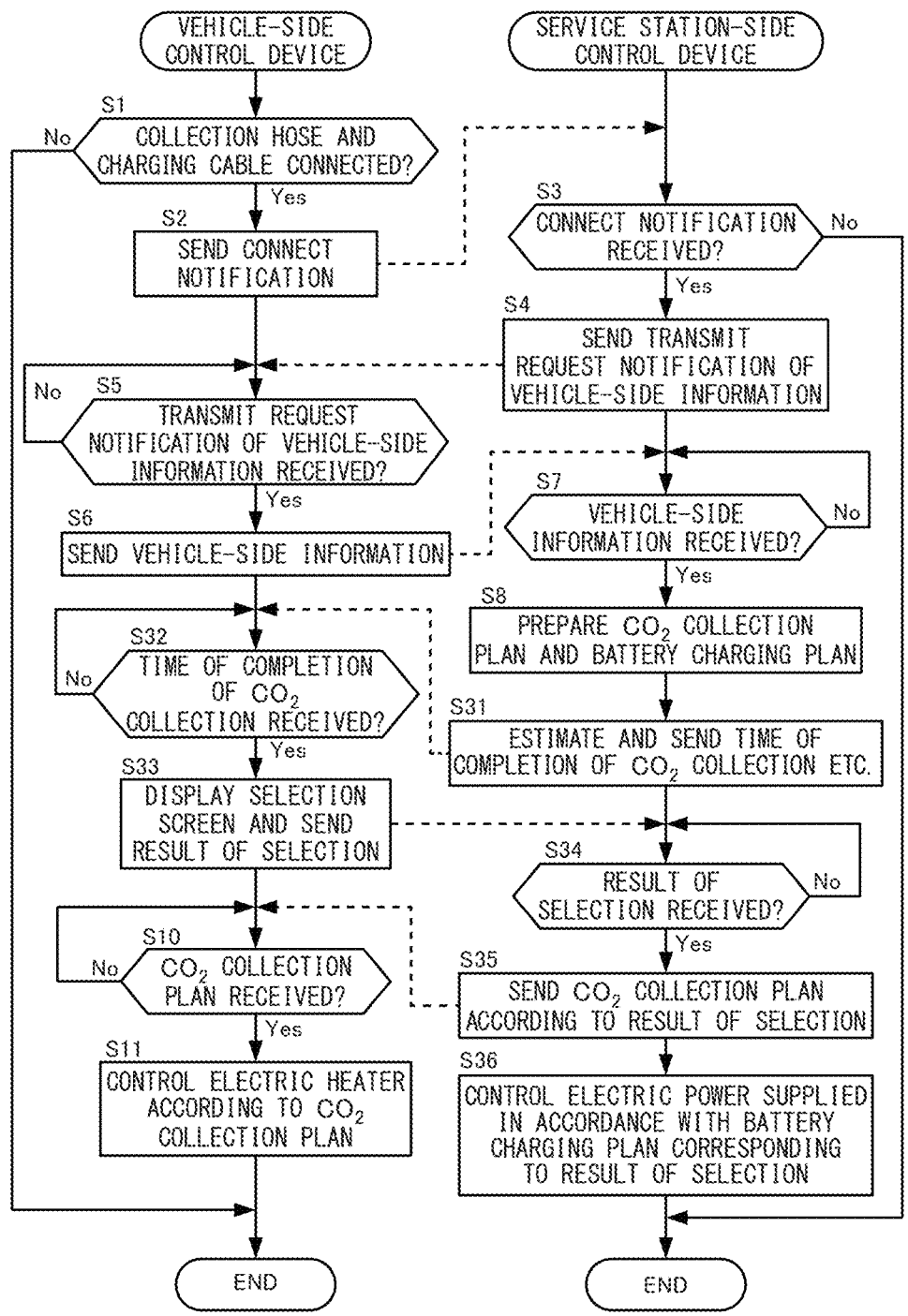
FIG. 12 is a flow chart explaining the content of processing according to a fifth embodiment of the present disclosure performed by the vehicle-side control device and service station-side control device when performing both $CO_2$ collection work and the battery charging work at a service station.

FIG. 12 is a flow chart explaining the content of processing according to the present embodiment performed by the vehicle-side control device 120 and service station-side control device 220 when performing both of the $CO_2$ collection work and charging work at the service station 200. Note that, in FIG. 12, the content of the processing of step S1 to step S8, step S10, and step S11 is similar to the third embodiment, so here the explanation will be omitted.

As shown in the flow chart of FIG. 12, after preparation of the $CO_2$ collection plan and charging plan, the service station-side control device 220 estimates the time of completion of $CO_2$ collection and the time of completion of charging according to the same and sends the estimates to the vehicle-side control device 120 (S8, S31).

Further, when receiving the time of completion of $CO_2$ collection and the time of completion of charging, the vehicle-side control device 120 makes the display part 130 display a selection screen displaying predetermined options and sends the result of selection by the worker to the service station-side control device 220 (at S32, Yes, S33).

Figure 13:
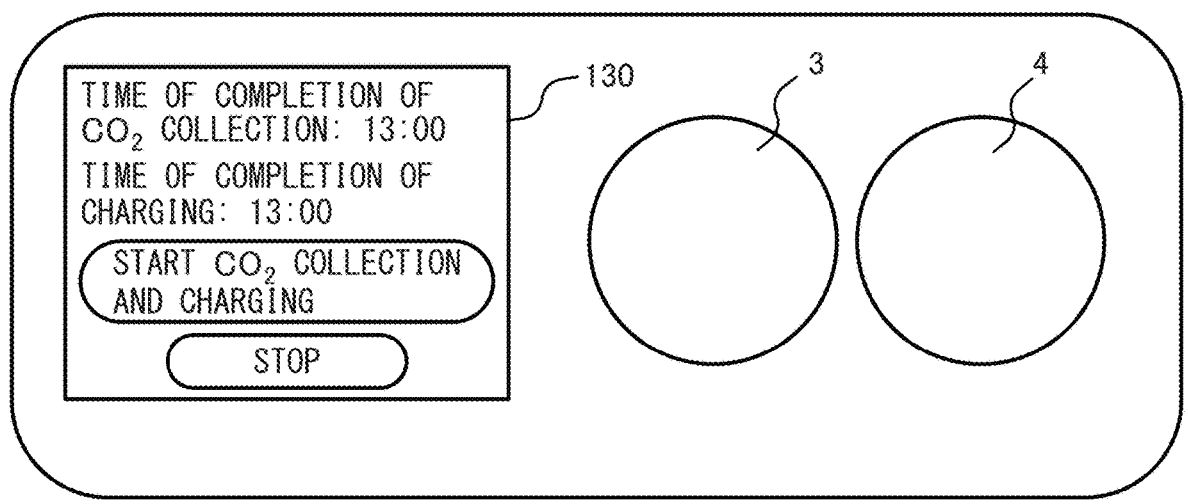
FIG. 13 is a view showing one example of a selection screen.

If the time of completion of $CO_2$ collection and the time of completion of charging are the same times, for example, as shown in FIG. 13, the selection screen can be made a screen which displays the time of completion of $CO_2$ collection and the time of completion of charging and displays the option of seeking permission for starting collection of $CO_2$ and charging of the battery 2.

Figure 14:
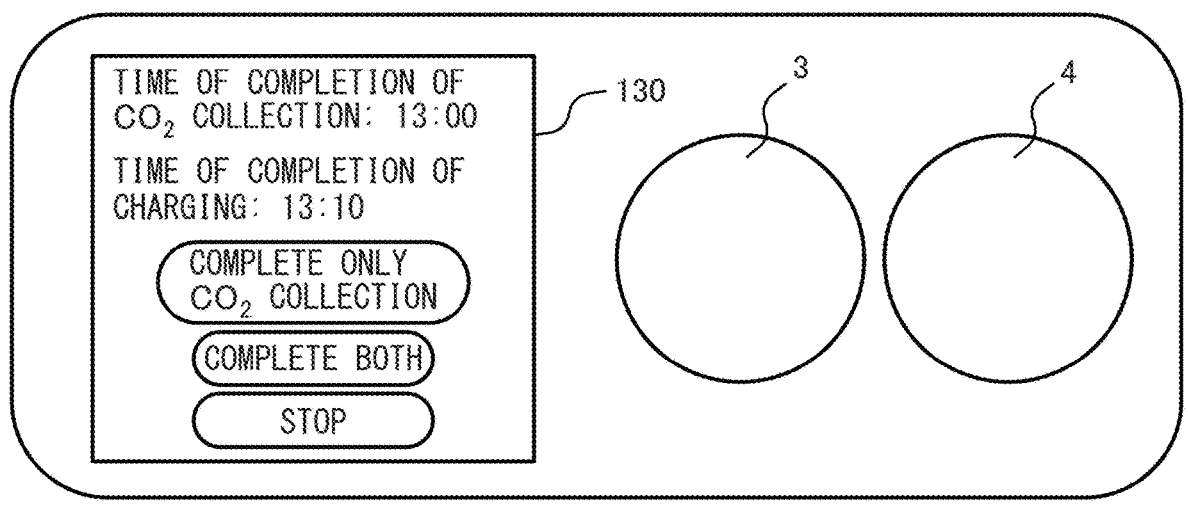
FIG. 14 is a view showing one example of a selection screen.

Further, the selection screen may be made a screen displaying, for example, as shown in FIG. 14, the time of completion of $CO_2$ collection and the time of completion of charging if the time of completion of $CO_2$ collection and the time of completion of charging differ and displaying the option of completing both of charging of the battery 2 and collection of $CO_2$ or seeking confirmation of ending the charging and collection of $CO_2$ at the point of time when either of these is completed.

When receiving the result of selection, the service station-side control device 220 sends a $CO_2$ collection plan corresponding to the result of selection to the service station-side control device 220. Specifically, when the received result of selection is a result of selection of completing both charging of the battery 2 and collection of $CO_2$ at the point of time when either is completed, the service station-side control device 220 corrects the $CO_2$ collection plan and charging plan according to the result of selection and sends the corrected $CO_2$ collection plan. On the other hand, when the received result of selection is another result of selection, it sends the prepared $CO_2$ collection plan without correcting the already prepared $CO_2$ collection plan and charging plan (at S34, Yes, S35).

Further, the vehicle-side control device 120 and service station-side control device 220 perform collection of $CO_2$ from the $CO_2$ recovery device 1 and supply of electric power to the battery 2 in accordance with the $CO_2$ collection plan and charging plan corresponding to the result of selection (S11, S36).

According to the present embodiment explained above, the vehicle-side control device 120 is configured so that when the time of completion of charging of the battery 2 and the time of completion of collection of $CO_2$ from the $CO_2$ recovery device 1 differ, it makes the display part 130 display in a selectable format the options of completing both charging of the battery 2 and collection of $CO_2$ from the $CO_2$ recovery device 1 or ending charging and collection of $CO_2$ at the point of time when either among them is completed.

Due to this, it becomes possible to perform charging and collection of $CO_2$ according to the intent of the worker, so the worker friendliness when performing the $CO_2$ collection work from the $CO_2$ recovery device 1 and charging work of the battery 2 can be further improved.

Note that in the present embodiment as well, the mobile terminal of an occupant of the vehicle 100 or other worker can be made to display the option of completing both the charging of the battery 2 and collection of $CO_2$ or ending the charging and collection of $CO_2$ at the point of time of completing either among these in a selectable format.

Sixth Embodiment

Next, a sixth embodiment of the present disclosure will be explained. The present embodiment differs from the fourth embodiment on the point of making the display part 130 display information to the effect that some sort of abnormality has occurred and collection of $CO_2$ from the $CO_2$ recovery device 1 or charging of the battery 2 can no longer be continued when that occurs. Below, the point of difference will be focused on in the explanation.

Figure 15:
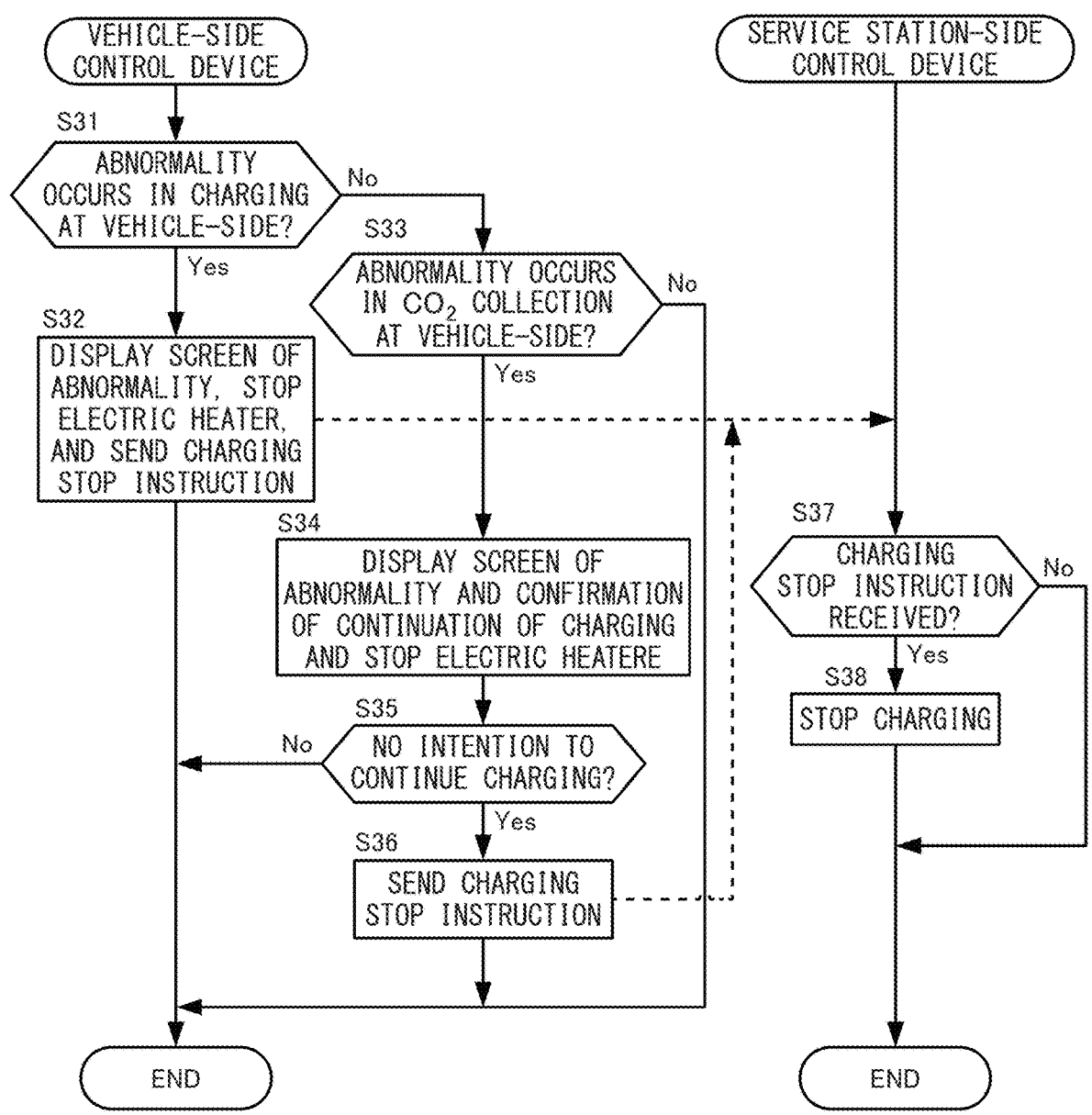
FIG. 15 is a flow chart explaining the content of processing according to a sixth embodiment of the present disclosure performed by the vehicle-side control device and service station-side control device when some sort of abnormality occurs at the vehicle side and the collection of $CO_2$ from the $CO_2$ recovery device or charging of the battery can no longer be continued.

FIG. 15 is a flow chart explaining the content of processing according to the present embodiment performed by the vehicle-side control device 120 and service station-side control device 220 when some sort of abnormality occurs at the vehicle-side and collection of $CO_2$ from the $CO_2$ recovery device 1 or charging of the battery 2 can no longer be continued.

Figure 16:
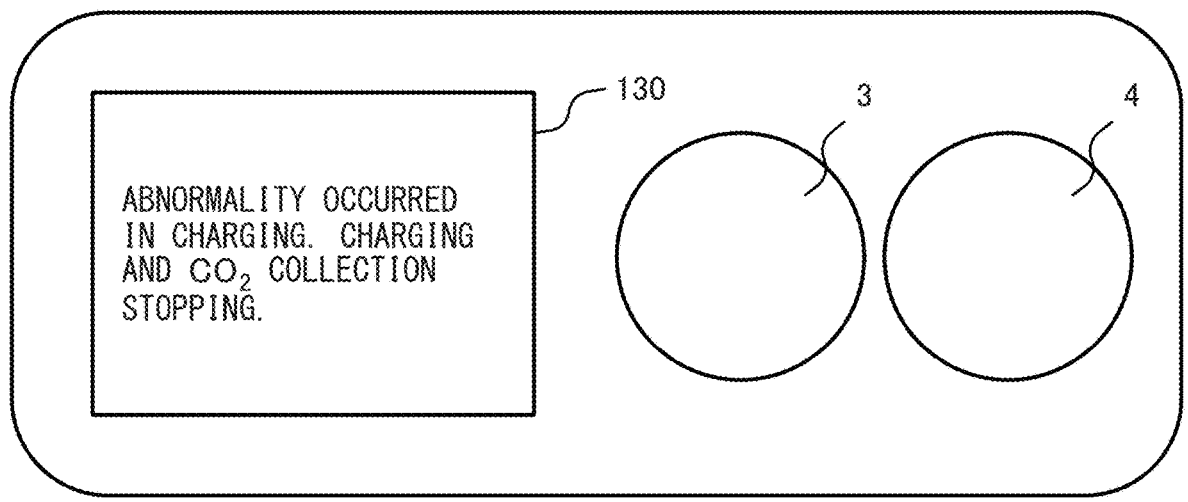
FIG. 16 is a view showing one example of a screen informing the occurrence of an abnormality in charging.

As shown in the flow chart of FIG. 15, when some sort of abnormality occurs at the vehicle-side and charging of the battery 2 can no longer be continued (at S31, Yes), it is not desirable to drive the electric heater 54 and consume electric power of the battery 2, so the vehicle-side control device 120 stops the driving of the electric heater 54 and sends the service station-side control device 220 a charging stop instruction (S32). Further, the vehicle-side control device 120, for example, as shown in FIG. 16, makes the display part 130 display that an abnormality has occurred and to stop the charging and $CO_2$ collection (S32).

Figure 17:
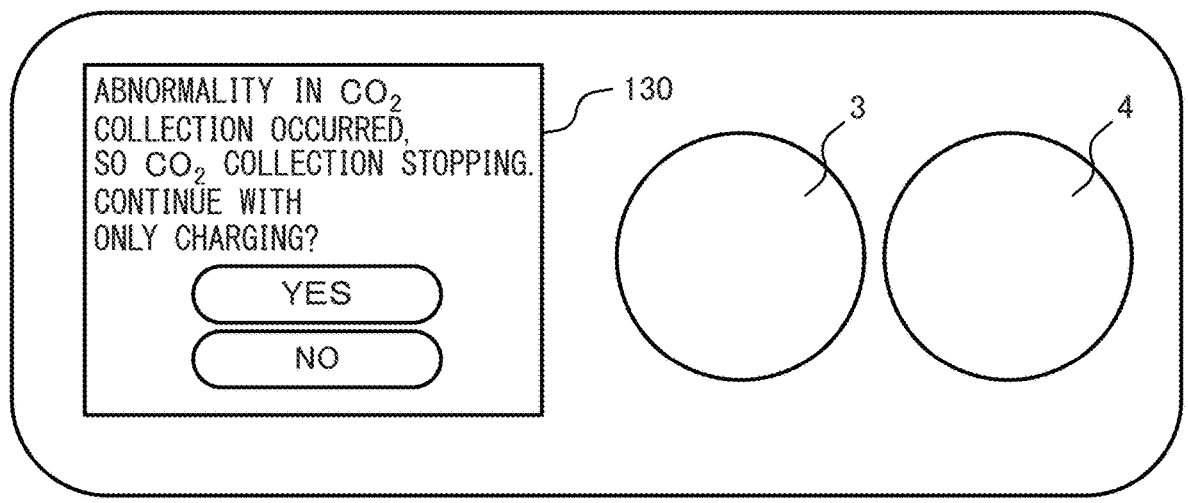
FIG. 17 is a view showing one example of a screen informing the occurrence of an abnormality in collection of $CO_2$.

Further, when some sort of abnormality occurs at the vehicle side and collection of $CO_2$ can no longer be continued (at S31, No, at S33, Yes), the vehicle-side control device 120 stops driving the electric heater 54 and, for example, as shown in FIG. 17, makes the display part 130 display to stop collection of $CO_2$ due to the occurrence of an abnormality of collection of $CO_2$ and the option of seeking confirmation of whether to continue charging of the battery 2 (S34). Further, when the worker selects not to continue charging of the battery 2 (at S35, Yes), the vehicle-side control device 120 sends the service station-side control device 220 a charging stop instruction (S36).

The service station-side control device 220 stops the supply of electric power from an outside power source to the battery 2 when receiving the charging stop instruction (at S37, Yes, S38).

Figure 18:
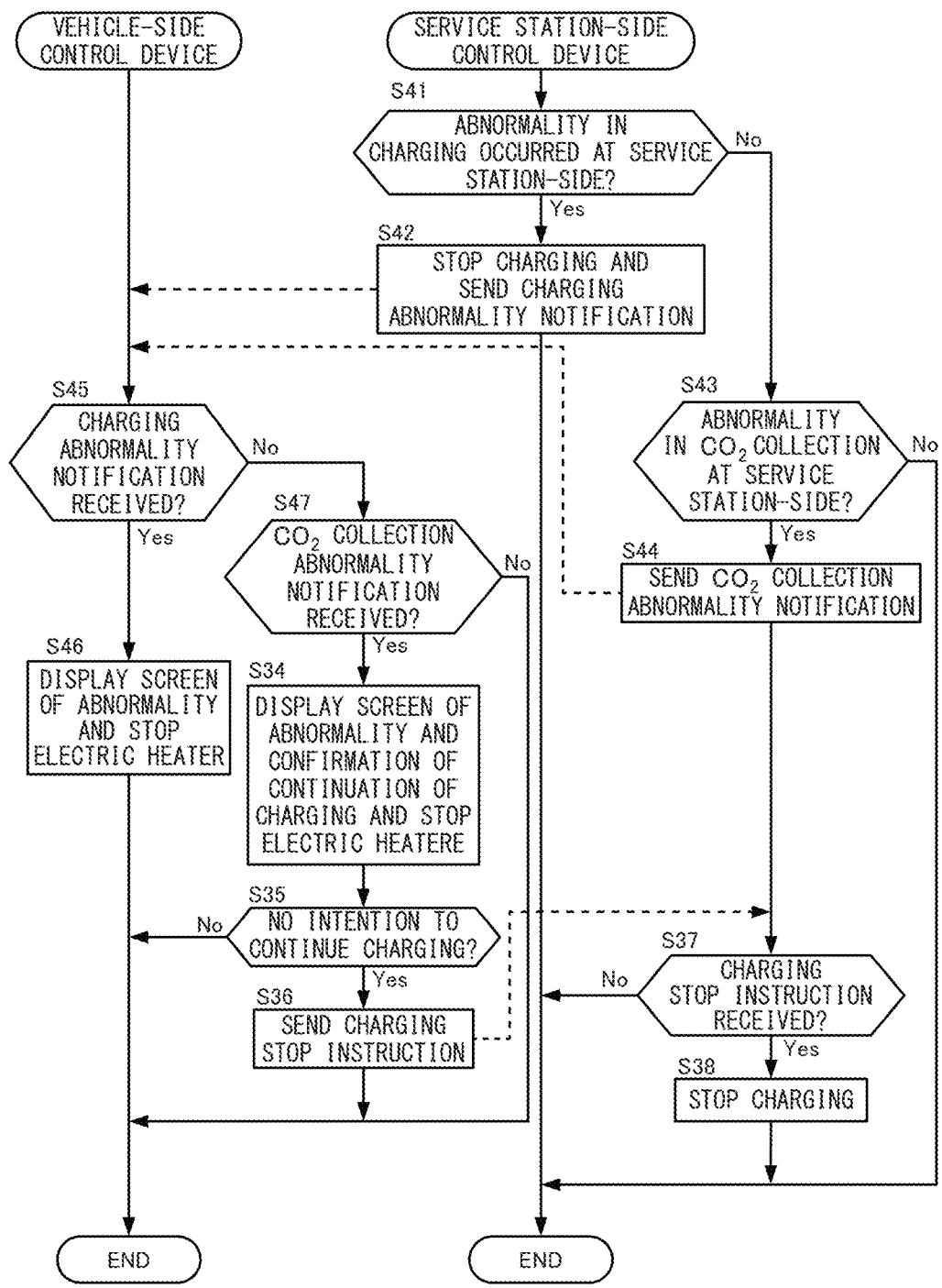
FIG. 18 is a flow chart explaining the content of processing according to a sixth embodiment of the present disclosure performed by the vehicle-side control device and service station-side control device when some sort of abnormality occurs at the service station side and the collection of $CO_2$ from the $CO_2$ recovery device or charging of the battery can no longer be continued.

FIG. 18 is a flow chart explaining the content of processing according to the present embodiment performed by the vehicle-side control device 120 and service station-side control device 220 when some sort of abnormality occurs at the service station 200 side and charging of the battery 2 or collection of $CO_2$ from the $CO_2$ recovery device 1 can no longer be continued.

As shown in the flow chart of FIG. 18, when some sort of abnormality occurs at the service station 200 side and charging of the battery 2 can no longer be continued (at S41, Yes), the service station-side control device 220 stops the charging of the battery 2 and sends a charging abnormality notification to the vehicle-side control device 120 (S42). Further, when some sort of abnormality occurs at the service station 200 side and collection of $CO_2$ can no longer be continued (at S41, No, at S43, Yes), the service station-side control device 220 sends a $CO_2$ collection abnormality notification to the vehicle-side control device 120 (S44).

When receiving the charging abnormality notification, the vehicle-side control device 120 stops driving the electric heater 54. Further, as shown in the above-mentioned FIG. 16, it makes the display part 130 display that an abnormality has occurred in the charging and to stop the charging and collection of $CO_2$ (S42). Further, when receiving the $CO_2$ collection abnormality notification, the vehicle-side control device 120, as shown in the above-mentioned FIG. 17, makes the display part 130 display at least to stop collection of $CO_2$ due to the occurrence of an abnormality in collection of $CO_2$ and the option of seeking confirmation of whether to continue charging of the battery 2 (S34).

According to the present embodiment explained above, the vehicle-side control device 120 is configured to make the display part 130 display information of the fact of occurrence of an abnormality when charging of the battery 2 or collection of $CO_2$ from the $CO_2$ recovery device 1 can no longer be continued at the vehicle 100 side or service station 200 side and further to make the display part 130 display, in a selectable format, whether to continue with only charging of the battery 2 when collection of $CO_2$ from the $CO_2$ recovery device 1 can no longer be continued.

Due to this, when an abnormality occurs, it becomes possible to perform charging and collection of $CO_2$ according to the intent of the worker, so the worker friendliness when performing the $CO_2$ collection work charging work of the battery 2 can be further improved.

Note that in the present embodiment as well, a mobile terminal held by an occupant of the vehicle 100 or a worker can be made to display information to the effect of occurrence of abnormality when charging of the battery 2 or collection of $CO_2$ from the $CO_2$ recovery device 1 can no longer be continued at the vehicle 100 side or service station 200 side and further can be made to display whether to continue only charging of the battery 2 if collection of $CO_2$ from the $CO_2$ recovery device 1 can no longer be continued.

Seventh Embodiment

Next, a seventh embodiment of the present disclosure will be explained. The present embodiment differs from the fourth embodiment on the point of decreasing the charging charge of the battery 2 in the service station 200 in accordance with the amount of $CO_2$ collection taken out from the $CO_2$ recovery device 1 and making the display part 130 display information on the fact of the decrease. Below, this point of difference will be focused on in the explanation.

Figure 19:
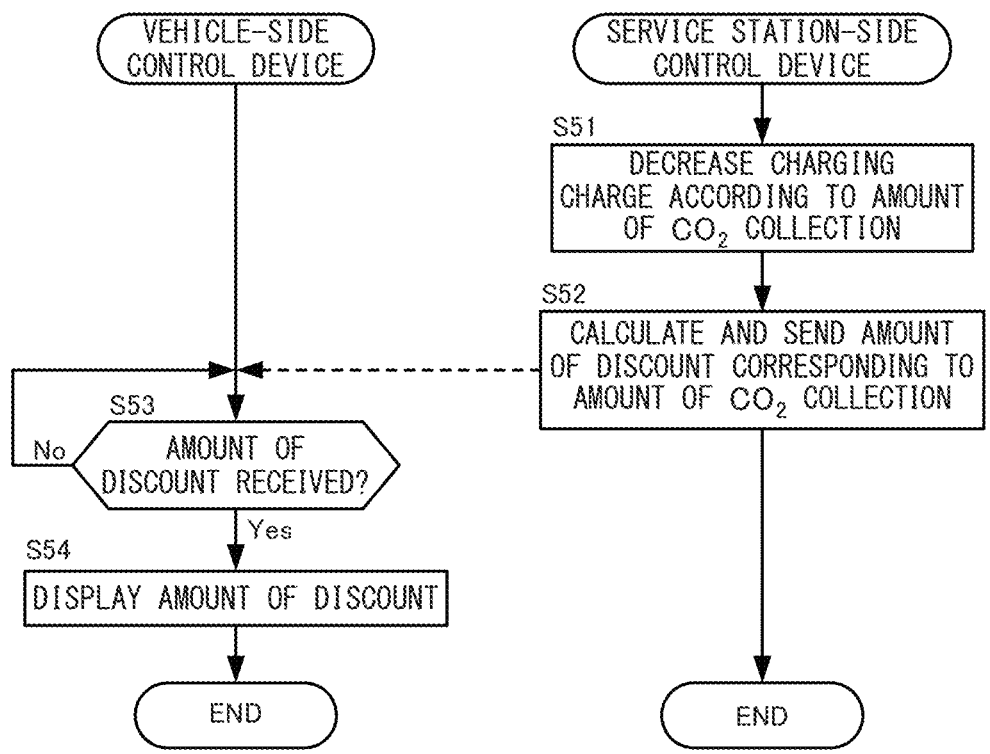
FIG. 19 is a flow chart explaining the content of processing according to the seventh embodiment of the present disclosure performed by the vehicle-side control device and service station-side control device when the collection of $CO_2$ from the $CO_2$ recovery device or charging of the battery are completed.

FIG. 19 is a flow chart explaining the content of processing by the present embodiment performed by the vehicle-side control device 120 and service station-side control device 220 when collection of $CO_2$ from the $CO_2$ recovery device 1 and charging of the battery 2 are completed.

Figure 20:
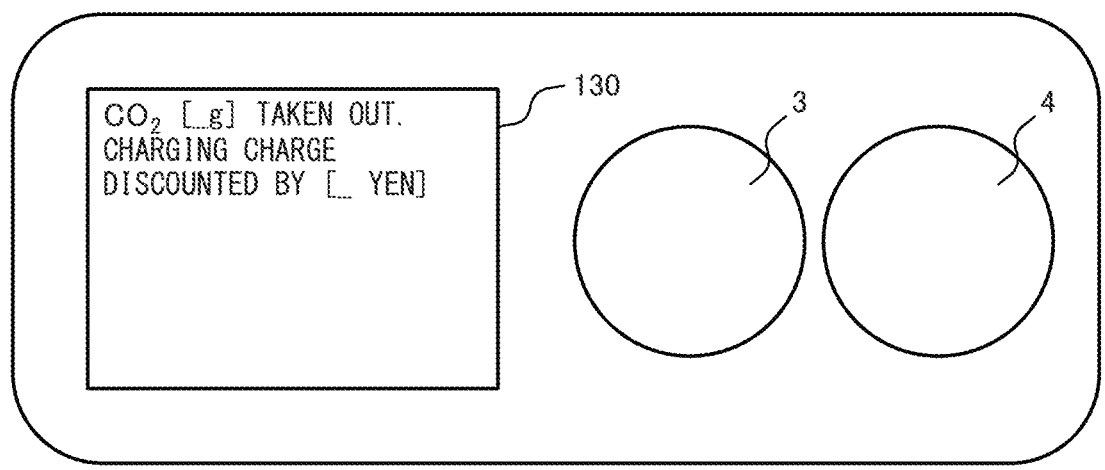
FIG. 20 is a view showing one example of a screen displaying an amount of discount in accordance with an amount of $CO_2$ collection.

As shown in the flow chart of FIG. 19, if collection of $CO_2$ from the $CO_2$ recovery device 1 and charging of the battery 2 are completed, the service station-side control device 220 decreases the charging charge of the battery 2 at the service station 200 in accordance with the amount of $CO_2$ collection taken out from the $CO_2$ recovery device 1 (SM). Further, the service station-side control device 220 sends an amount of discount of the charging charge of the battery 2 corresponding to the amount of $CO_2$ collection together with the amount of $CO_2$ collection to the vehicle-side control device 120 (S52). Further, if receiving the amount of discount of the charging charge of the battery 2, the vehicle-side control device 120, for example, as shown in FIG. 20, makes the display part 130 display the amount of $CO_2$ collection and the amount of discount (at S53, Yes, S54).

The service station-side control device 220 of the service station 200 according to the present embodiment explained above is configured to decrease the charging charge of the battery 2 in accordance with the amount of $CO_2$ collection taken out from the $CO_2$ recovery device 1.

Due to this, the merits of owning a vehicle 100 mounting the $CO_2$ recovery device 1 can be seen, so it is possible to promote the spread of vehicles 100 mounting $CO_2$ recovery devices 1 and promote the recovery of $CO_2$ from the atmosphere.

Eighth Embodiment

Next, an eighth embodiment of the present disclosure will be explained.

As shown in FIG. 21, the vehicle 100 according to the present embodiment is provided with an onboard display part 140 providing the vehicle occupant with various types of information at a position which a vehicle occupant inside the vehicle can see. The vehicle-side control device 120 is configured to display discount information of electric charges corresponding to the amount of $CO_2$ collection when collecting $CO_2$ from the $CO_2$ recovery device 1 at a position of the service station 200 on the map displayed at the onboard display part 140 (for example, discount amount per unit amount of collection).

Due to this, the vehicle occupant can obtain a grasp of service stations offering large discounts, so the vehicle occupant can be made to feel more the merits of the vehicle 100 mounting the $CO_2$ recovery device 1.

Above, embodiments of the present disclosure were explained, but the above embodiments only show some of the examples of application of the present disclosure and are not meant to limit the technical scope of the present disclosure to the specific configurations of the above embodiments.

For example, in the above embodiments, the example of the vehicle 100 being an EV was used for the explanation, but the vehicle 100 may also be a PHV. Further, if the vehicle 100 is a PHV, the $CO_2$ recovery device 1 may also be configured to enable recovery of $CO_2$ in exhaust discharged from an internal combustion engine. Further, in the above embodiments, the charging plan and $CO_2$ collection plan were prepared at the service station-side control device 220, but they may also be prepared at the vehicle-side control device 120 and sent to the service station-side control device 220.

The invention claimed is:

1. A vehicle, comprising:
a rechargeable battery;
a charging port for supplying the battery with electric power of an outside power source;
a $CO_2$ recovery device configured to recover $CO_2$;
a $CO_2$ collection port for collecting $CO_2$ from the $CO_2$ recovery device;
a single openable lid configured to cover both the charging port and the $CO_2$ collection port;
an electric heater for heating the $CO_2$ recovery device; and
a control device, wherein the control device is configured to drive the electric heater by electric power supplied from the outside power source to heat the $CO_2$ recovery device.

2. A vehicle, comprising:
a rechargeable battery;
a charging port for supplying the battery with electric power of an outside power source;
a $CO_2$ recovery device configured to recover $CO_2$;
a $CO_2$ collection port for collecting $CO_2$ from the $CO_2$ recovery device;
a single openable lid configured to cover both the charging port and the $CO_2$ collection port;
a display part configured to provide information to a worker performing charging work of the battery and work of collecting $CO_2$ from the $CO_2$ recovery device;
a communication device configured to able to communicate with a service station for charging the battery and collecting $CO_2$ from the $CO_2$ recovery device; and
a control device, wherein the control device is configured to make the display part display the information on a time of completion of charging the battery and a time of completion of collection of $CO_2$ from the $CO_2$ recovery device received from the service station through the communication device.

3. The vehicle according to claim 2, wherein
the control device is further configured to make the display part display in a selectable format whether to complete both charging the battery and collecting $CO_2$ from the $CO_2$ recovery device or whether to end the charging and the $CO_2$ collection at the time when one among these has been completed when the time of completion of charging the battery and the time of completion of collection of $CO_2$ from the $CO_2$ recovery device differ.

4. The vehicle according to claim 2, wherein
the control device is further configured to make the display part display information on when charging of the battery or collection of $CO_2$ from the $CO_2$ recovery device can no longer be continued when that is so and to display in a selectable format whether to continue only charging the battery if collection of $CO_2$ from the $CO_2$ recovery device can no longer be continued.

5. A vehicle further comprising:
a rechargeable battery;
a charging port for supplying the battery with electric power of an outside power source;
a $CO_2$ recovery device configured to recover $CO_2$;
a $CO_2$ collection port for collecting $CO_2$ from the $CO_2$ recovery device;
a single openable lid configured to cover both the charging port and the $CO_2$ collection port;
an onboard display part for providing a vehicle occupant with information; and
a control device, wherein the control device is configured to display discount information of an electric charge according to the amount of collection of $CO_2$ when collecting $CO_2$ from the $CO_2$ recovery device at a service station at the position of the service station for charging the battery of the vehicle and for collecting $CO_2$ from the $CO_2$ recovery device on a map displayed at the onboard display part.

6. A terminal associated with an occupant of a vehicle, the vehicle comprising a rechargeable battery, a charging port for supplying the battery with electric power of an outside power source, a $CO_2$ recovery device configured to recover $CO_2$, a $CO_2$ collection port for collecting $CO_2$ from the $CO_2$ recovery device, and a single openable lid configured to cover both the charging port and the $CO_2$ collection port, wherein the terminal comprises:
a display part for displaying information;
a communication device configured to be able to communicate with a service station for charging a battery and for collecting $CO_2$ from the $CO_2$ recovery device; and
a processing device configured to make the display part display information relating to the time of completion of charging the battery and the time of completion of collection of $CO_2$ from the $CO_2$ recovery device received from the service station-side through the communication device.

7. The terminal according to claim 6, wherein
the processing device is configured to make the display part display in a selectable format whether to complete both charging the battery and collecting $CO_2$ from the $CO_2$ recovery device or whether to end the charging and the $CO_2$ collection at the time when one among these has been completed when the time of completion of charging the battery and the time of completion of collection of $CO_2$ from the $CO_2$ recovery device differ.

8. A service station for charging a rechargeable battery and for collecting $CO_2$ from a $CO_2$ recovery device of a vehicle, the vehicle comprising the rechargeable battery, a charging port for supplying the battery with electric power of an outside power source, the $CO_2$ recovery device configured to recover $CO_2$, a $CO_2$ collection port for collecting $CO_2$ from the $CO_2$ recovery device, and a single openable lid configured to cover both the charging port and the $CO_2$ collection port, the service station comprising:
a service station-side communication device configured to receive vehicle-side information including an empty capacity of the battery sent from a vehicle-side communication device mounted at the vehicle and an amount of $CO_2$ recovery of the $CO_2$ recovery device; and
a service station-side control device configured to control the amount of charging of the battery and the amount of $CO_2$ collected from the $CO_2$ recovery device based on the vehicle-side information so that the time of completion of charging the battery and the time of completion of collection of $CO_2$ from the $CO_2$ recovery device become the same times.

9. A service station for charging a rechargeable battery and for collecting $CO_2$ from a $CO_2$ recovery device of a vehicle, the vehicle comprising the rechargeable battery, a charging port for supplying the battery with electric power of an outside power source, the $CO_2$ recovery device configured to recover $CO_2$, a $CO_2$ collection port for collecting $CO_2$ from the $CO_2$ recovery device, and a single openable lid configured to cover both the charging port and the $CO_2$ collection port, the service station discounting a charging charge of the rechargeable battery in accordance with an amount of $CO_2$ collected from the $CO_2$ recovery device.

* * * * *